(12) United States Patent
Aquino

(10) Patent No.: US 9,513,089 B2
(45) Date of Patent: Dec. 6, 2016

(54) UNOBTRUSIVE HIGH-END READY TO WEAR CONCEALABLE BODY ARMOR

(71) Applicant: Doo Kalmanson Aquino, New York, NY (US)

(72) Inventor: Doo Kalmanson Aquino, New York, NY (US)

(*) Notice: Subject to any disclaimer, the term of this patent is extended or adjusted under 35 U.S.C. 154(b) by 673 days.

(21) Appl. No.: 13/986,149

(22) Filed: Apr. 5, 2013

(65) Prior Publication Data

US 2014/0150154 A1    Jun. 5, 2014

Related U.S. Application Data

(63) Continuation-in-part of application No. 12/462,306, filed on Aug. 3, 2009, now Pat. No. 8,555,412.

(60) Provisional application No. 61/620,503, filed on Apr. 5, 2012, provisional application No. 61/852,142, filed on Mar. 15, 2013.

(51) Int. Cl.
| | |
|---|---|
| A41D 27/06 | (2006.01) |
| A41D 13/05 | (2006.01) |
| F41H 1/02 | (2006.01) |
| B32B 5/02 | (2006.01) |
| B32B 5/26 | (2006.01) |
| A41D 13/00 | (2006.01) |

(52) U.S. Cl.
CPC .............. *F41H 1/02* (2013.01); *B32B 5/022* (2013.01); *B32B 5/024* (2013.01); *B32B 5/26* (2013.01); *A41D 13/055* (2013.01); *B32B 2262/0253* (2013.01); *B32B 2262/0269* (2013.01); *B32B 2307/558* (2013.01); *B32B 2307/56* (2013.01); *B32B 2571/02* (2013.01)

(58) Field of Classification Search
CPC .......... F41H 1/02; F41H 5/04; F41H 5/0485; F41H 5/0492; F41H 5/0478; A41D 27/00; A41D 13/00; A41D 13/0015; A41D 13/0002; A41D 19/01505; A41D 31/00; A41D 13/012; A41D 27/20; A41D 31/0055; A41D 31/0061; A41D 31/0011
See application file for complete search history.

(56) References Cited

U.S. PATENT DOCUMENTS

| | | |
|---|---|---|
| 2,052,684 A | 9/1936 | Wlsbrod |
| 2,424,985 A | 8/1947 | Howard |
| 2,517,615 A | 8/1950 | Webster et al. |
| 2,743,446 A | 5/1956 | Persico et al. |
| 2,747,190 A | 5/1956 | Foster |
| 2,748,391 A | 6/1956 | Lewis, Jr. et al. |
| 3,061,839 A | 11/1962 | Foster |

(Continued)

FOREIGN PATENT DOCUMENTS

WO    WO2012144894    10/2012

OTHER PUBLICATIONS

Webposting of Jan. 20, 1999 by Doo Aquino Co., http://www.mindspring.com/~doo_aquino_co/Doo_aquinoCo.htm.

(Continued)

*Primary Examiner* — Bobby Muromoto, Jr.

(57) ABSTRACT

A bullet resistant garment is provided for in the current invention having a pliable protective insert contained within a concealed carrier shell that is integrated into an outer-garment. In certain embodiments, interconnecting seams and or darts may be incorporated into the pliable protective insert and/or carrier shell to provide a comfortable and protective three-dimensional shape to bullet resistant garment, especially for women.

1 Claim, 15 Drawing Sheets

(56) References Cited

U.S. PATENT DOCUMENTS

| | | | |
|---|---|---|---|
| 3,337,875 A | 8/1967 | Blakeney | |
| 3,409,907 A | 11/1968 | Barratt | |
| 3,452,362 A | 7/1969 | Korolick et al. | |
| 3,562,810 A | 2/1971 | Davis | |
| 3,771,171 A | 11/1973 | Mitchell | |
| 3,843,969 A | 10/1974 | George et al. | |
| 3,855,632 A * | 12/1974 | Davis | F41H 1/02 2/2.5 |
| 3,891,996 A | 7/1975 | Leach et al. | |
| 3,973,275 A | 8/1976 | Blauer | |
| 3,988,780 A | 11/1976 | Armellino | |
| 4,198,494 A | 4/1980 | Burekel | |
| 4,266,297 A | 5/1981 | Atkins | |
| 4,413,357 A | 11/1983 | Sacks | |
| 4,466,135 A | 8/1984 | Coppage, Jr. | |
| 4,479,999 A | 10/1984 | Buckley et al. | |
| 4,483,020 A | 11/1984 | Dunn | |
| 4,485,491 A | 12/1984 | Rasmussen | |
| 4,497,069 A * | 2/1985 | Braunhut | F41H 1/02 2/2.5 |
| 4,507,802 A | 4/1985 | Small | |
| 4,535,478 A | 8/1985 | Zufle | |
| 4,608,716 A | 9/1986 | Brumfield | |
| 4,623,574 A | 11/1986 | Harpell et al. | |
| 5,008,959 A | 4/1991 | Coppage et al. | |
| 5,072,453 A | 12/1991 | Widder | |
| 5,157,792 A | 10/1992 | Allen et al. | |
| 5,175,040 A | 12/1992 | Harpell et al. | |
| 5,325,537 A | 7/1994 | Marion | |
| 5,327,811 A | 7/1994 | Price et al. | |
| 5,331,683 A | 7/1994 | Stone et al. | |
| 5,471,906 A | 12/1995 | Bachner et al. | |
| 5,495,620 A | 3/1996 | Schoenweiss et al. | |
| 5,495,621 A | 3/1996 | Kibbee | |
| 5,584,737 A | 12/1996 | Luhtala | |
| 5,943,694 A * | 8/1999 | Moureaux | A41D 31/0061 2/2.5 |
| 5,970,513 A | 10/1999 | Kocher | |
| 5,974,585 A | 11/1999 | Bachner, Jr. | |
| 6,035,438 A | 3/2000 | Neal et al. | |
| 6,088,831 A | 7/2000 | Jensen et al. | |
| 6,131,198 A | 10/2000 | Westrick | |
| 6,159,590 A | 12/2000 | Kim | |
| 6,170,378 B1 | 1/2001 | Neal et al. | |
| 6,189,157 B1 | 2/2001 | Ziegler | |
| 6,233,737 B1 | 5/2001 | Ditchfield et al. | |
| 6,260,196 B1 | 7/2001 | van der Sleesen | |
| 6,698,024 B2 | 3/2004 | Graves | |
| 6,704,934 B2 | 3/2004 | Graham et al. | |
| 6,705,197 B1 | 3/2004 | Neal | |
| 6,745,661 B1 | 6/2004 | Neal et al. | |
| 6,846,545 B2 | 1/2005 | Thomas | |
| 6,961,958 B1 | 11/2005 | Seitzinger | |
| 6,962,739 B1 | 11/2005 | Kim et al. | |
| 7,226,878 B2 | 6/2007 | Wagner et al. | |
| 7,498,276 B2 | 3/2009 | Wagner et al. | |
| 7,546,853 B2 | 6/2009 | Rock | |
| 7,556,855 B2 | 7/2009 | Biermann et al. | |
| 7,776,401 B2 | 8/2010 | Sauer et al. | |
| 7,825,045 B1 | 11/2010 | Wagner et al. | |
| 2002/0006944 A1 | 1/2002 | Graham et al. | |
| 2002/0073473 A1 | 6/2002 | Bachner et al. | |
| 2004/0003445 A1 * | 1/2004 | Dovner | F41H 5/0485 2/2.5 |
| 2006/0175581 A1 | 8/2006 | Douglas | |
| 2006/0253950 A1 | 11/2006 | Kerr | |
| 2007/0079414 A1 | 4/2007 | Learmont | |
| 2007/0079416 A1 | 4/2007 | Carlson | |
| 2007/0169244 A1 | 7/2007 | Wells | |
| 2007/0234459 A1 | 10/2007 | Stewart | |
| 2008/0075933 A1 | 3/2008 | Rovers | |
| 2008/0098500 A1 | 5/2008 | Matic et al. | |
| 2009/0142535 A1 | 6/2009 | Kim et al. | |
| 2009/0142557 A1 | 6/2009 | Hardin | |
| 2009/0255022 A1 | 10/2009 | Smith et al. | |
| 2010/0221521 A1 | 9/2010 | Wagner et al. | |
| 2011/0023201 A1 * | 2/2011 | Pearl | F41H 1/02 2/2.5 |
| 2012/0124713 A1 * | 5/2012 | Blauer | F41H 1/02 2/102 |
| 2012/0246788 A1 | 10/2012 | Harrell et al. | |

OTHER PUBLICATIONS

ISA/220 Notification of Transmittal or Search Report and Written Opinion of the ISA dated Jan. 22, 2015.

Outgoing ISA/210 International Search Report dated Jan. 22, 2015.

Outgoing Written Opinion of the ISA dated Jan. 22, 2015.

\* cited by examiner

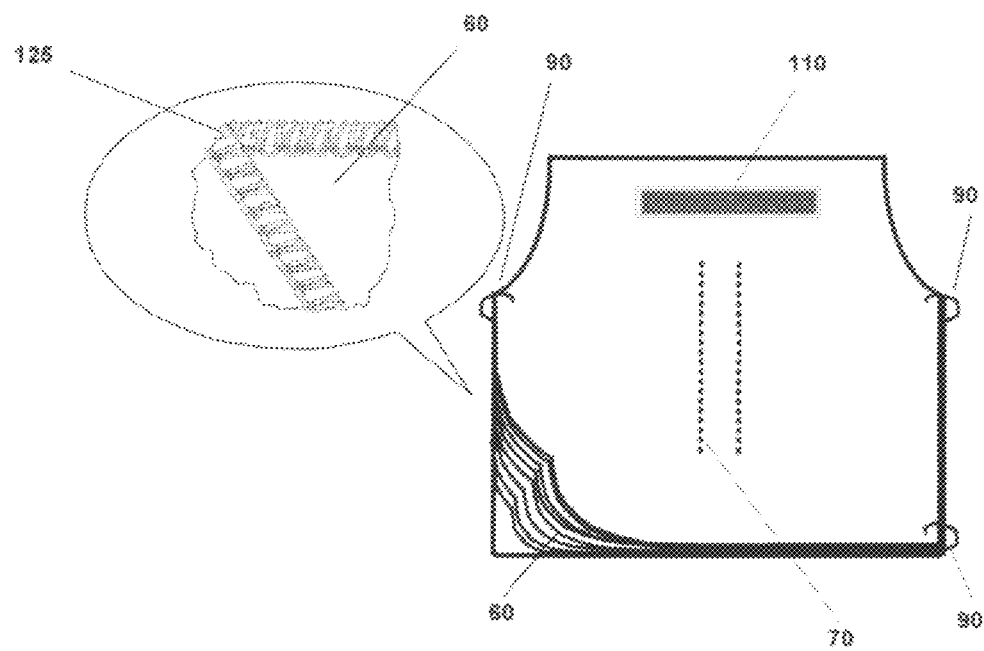
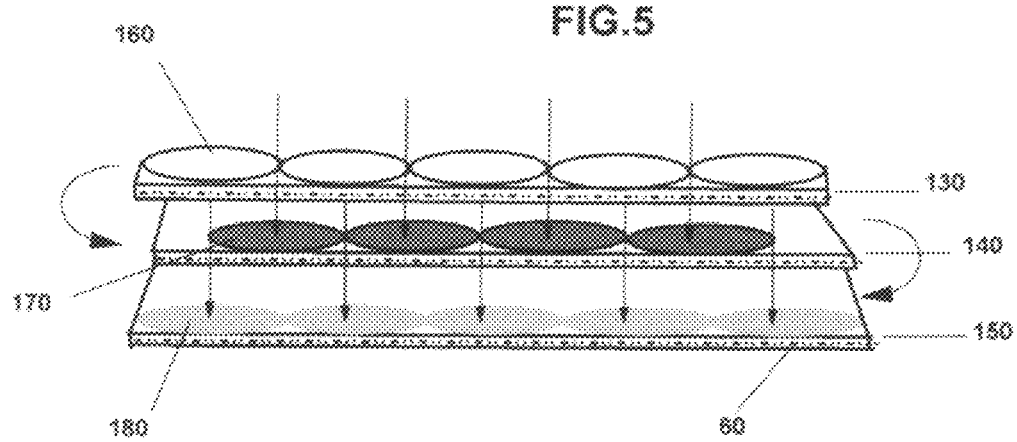
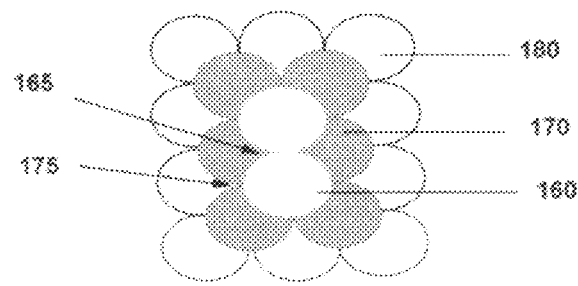

FIG. 7
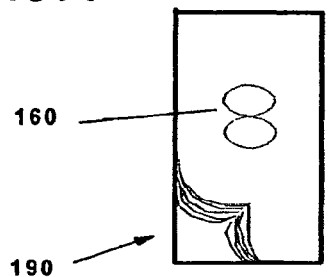
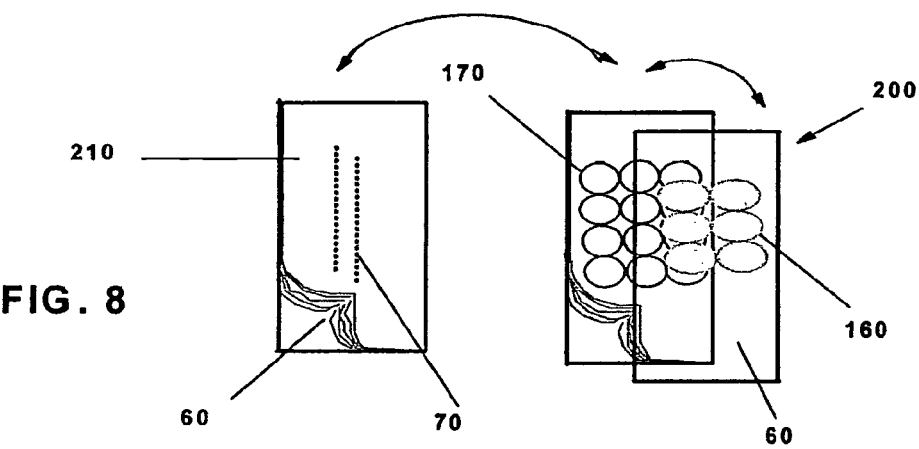
FIG. 8
FIG. 9
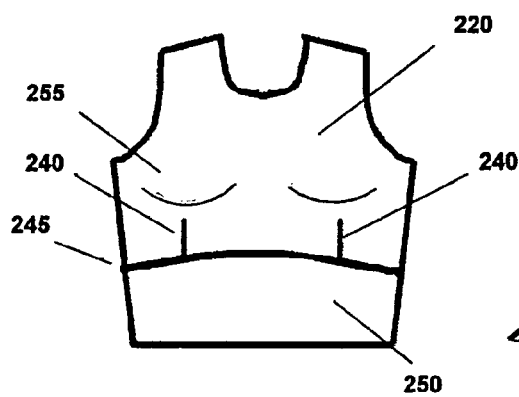
FIG. 11
FIG. 10
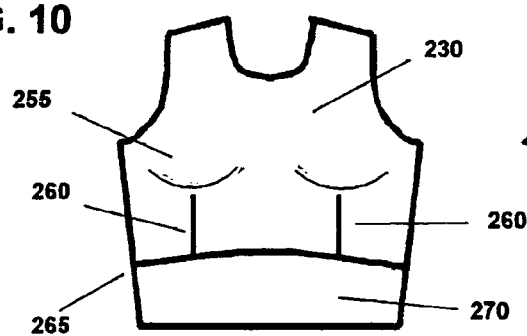

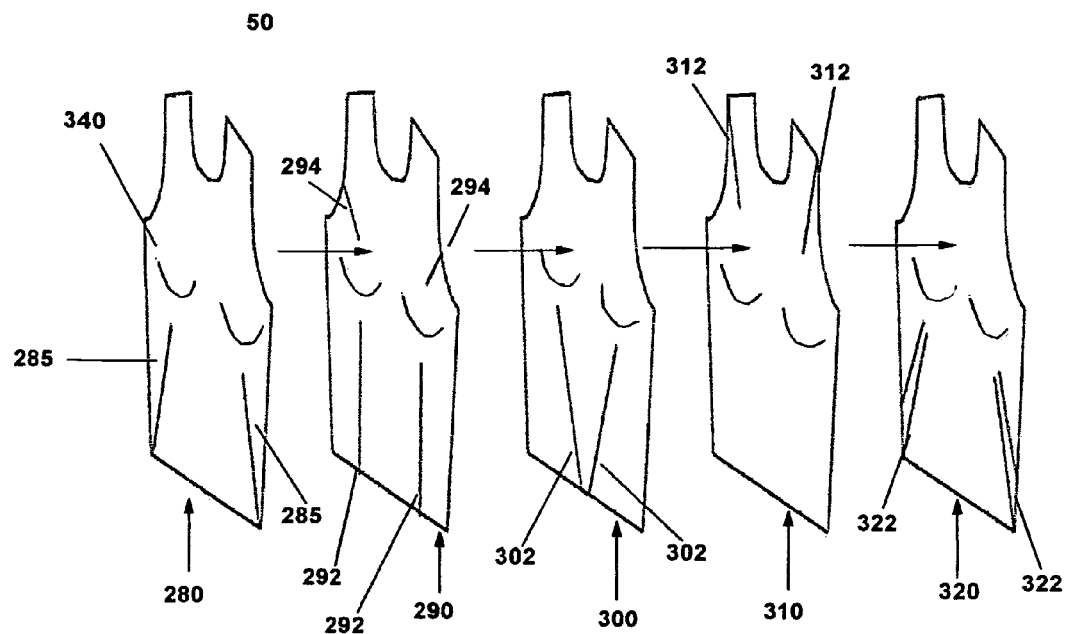
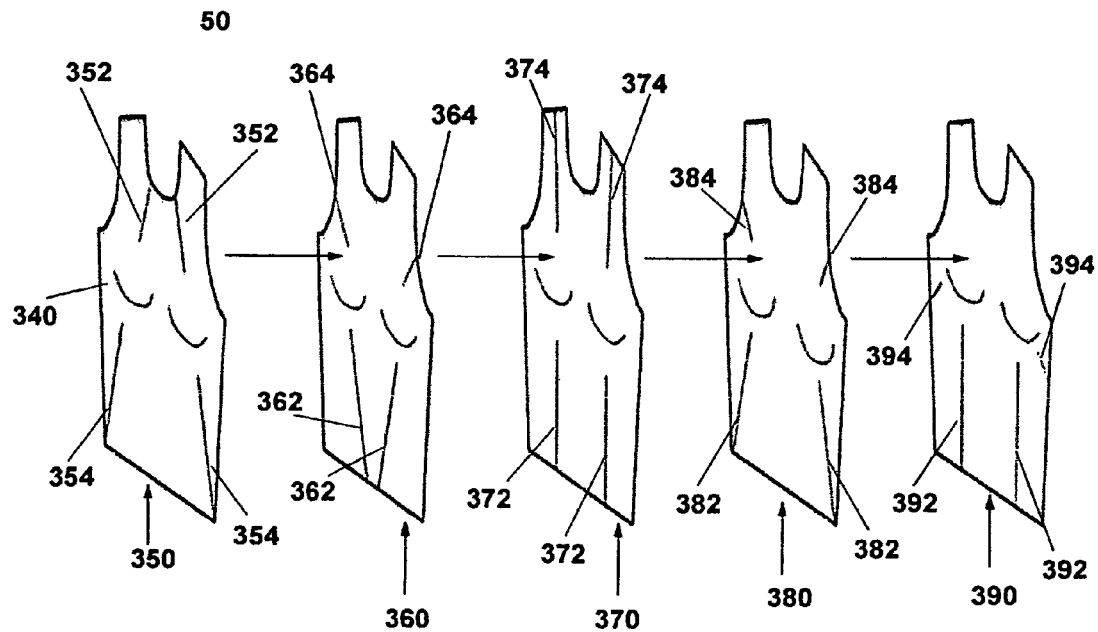

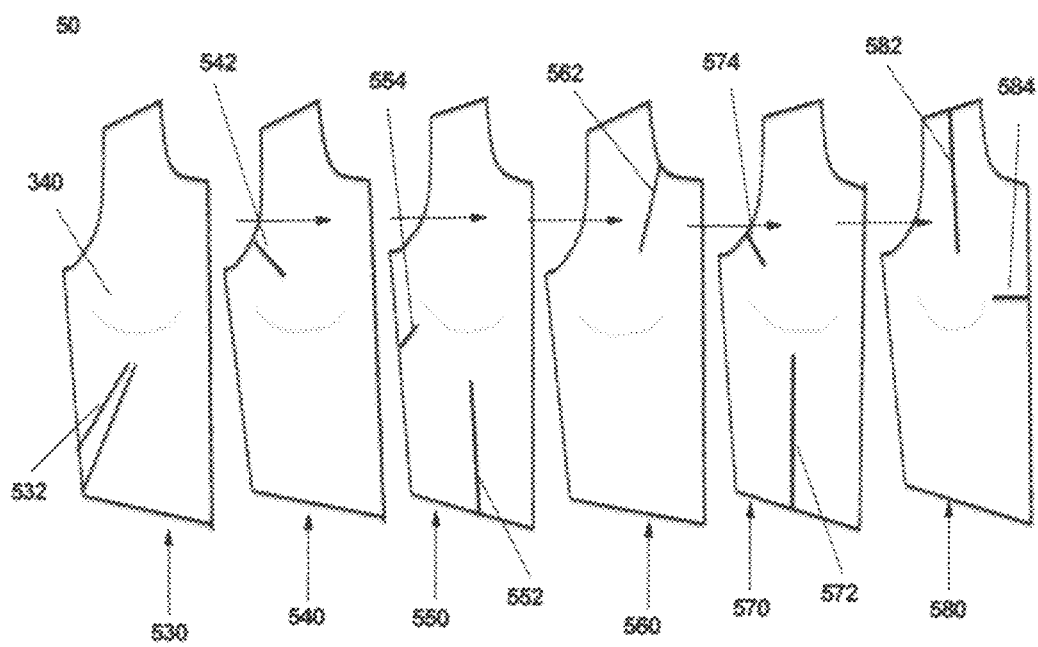
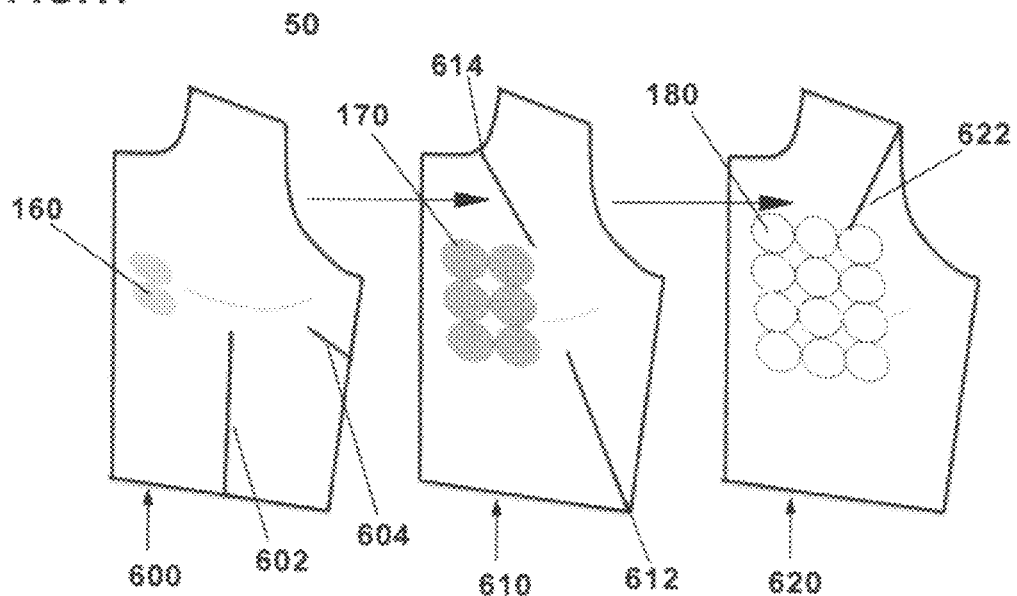

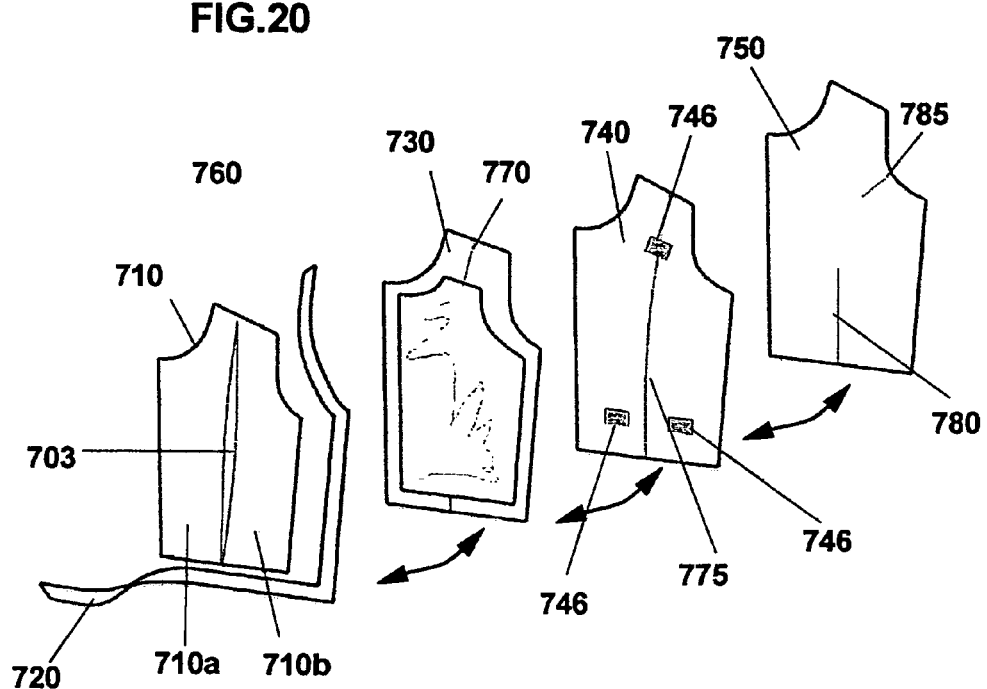

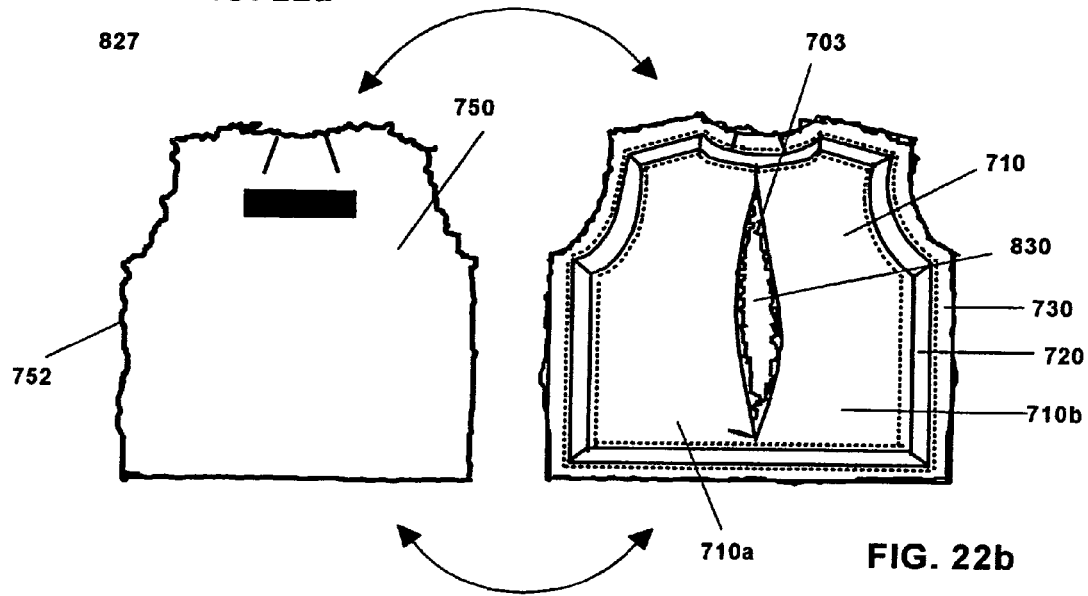
FIG. 22a
FIG. 22b
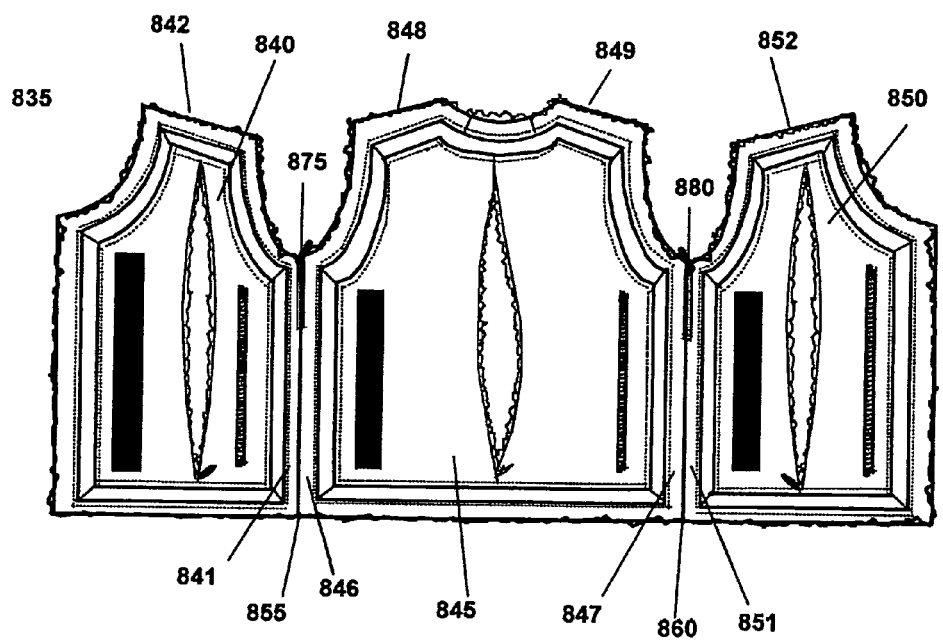
FIG. 23

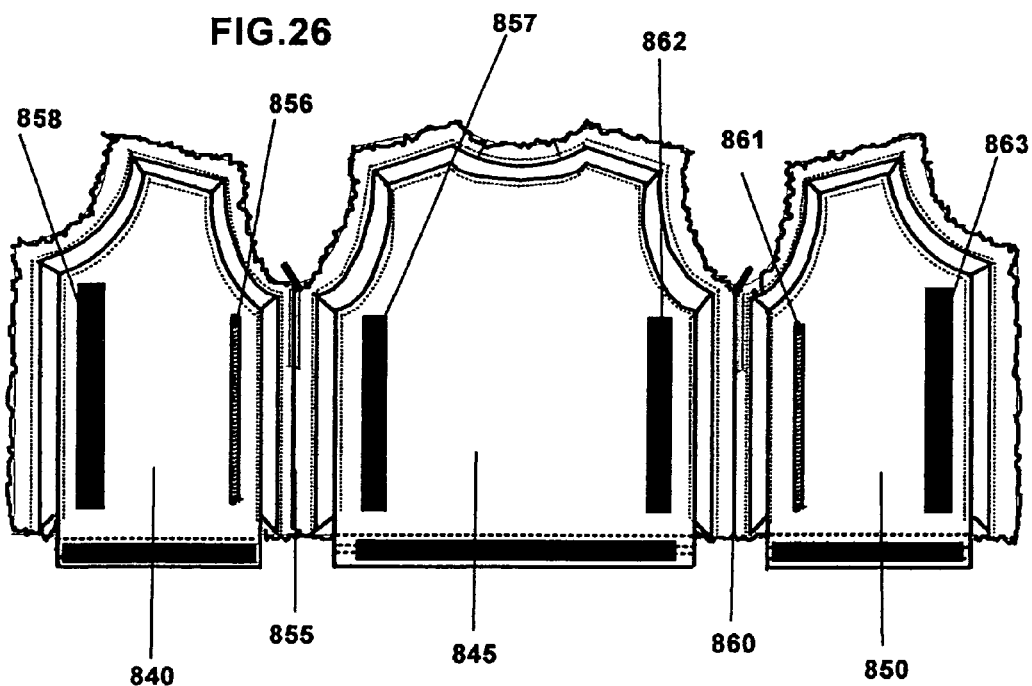
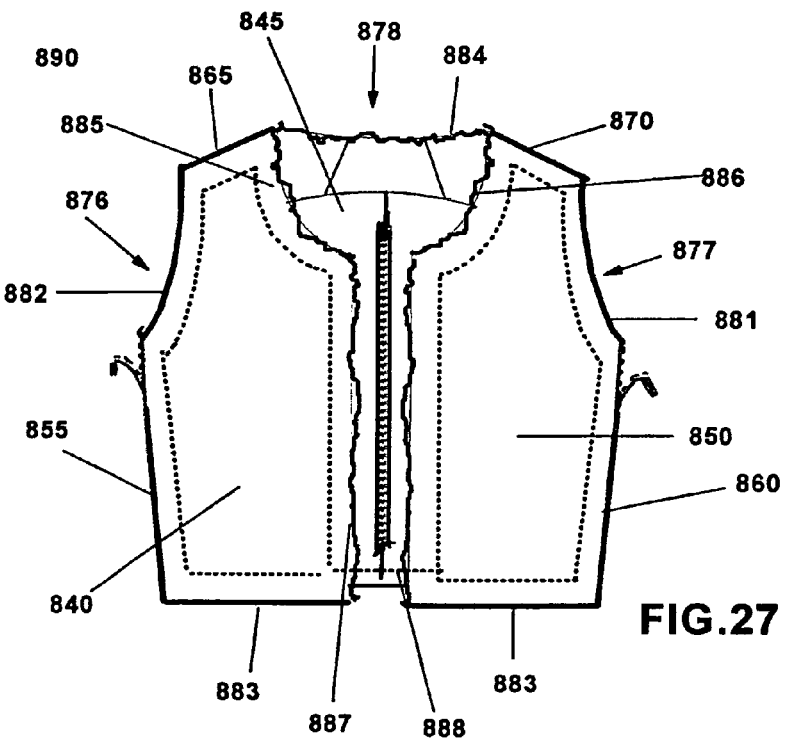

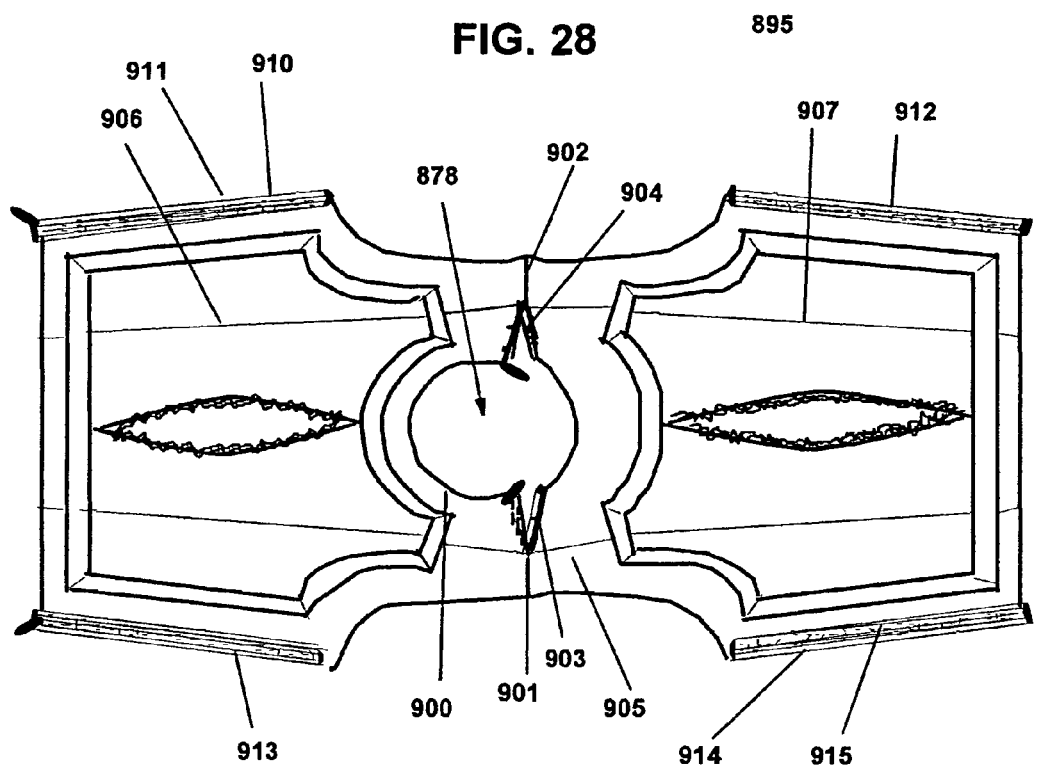
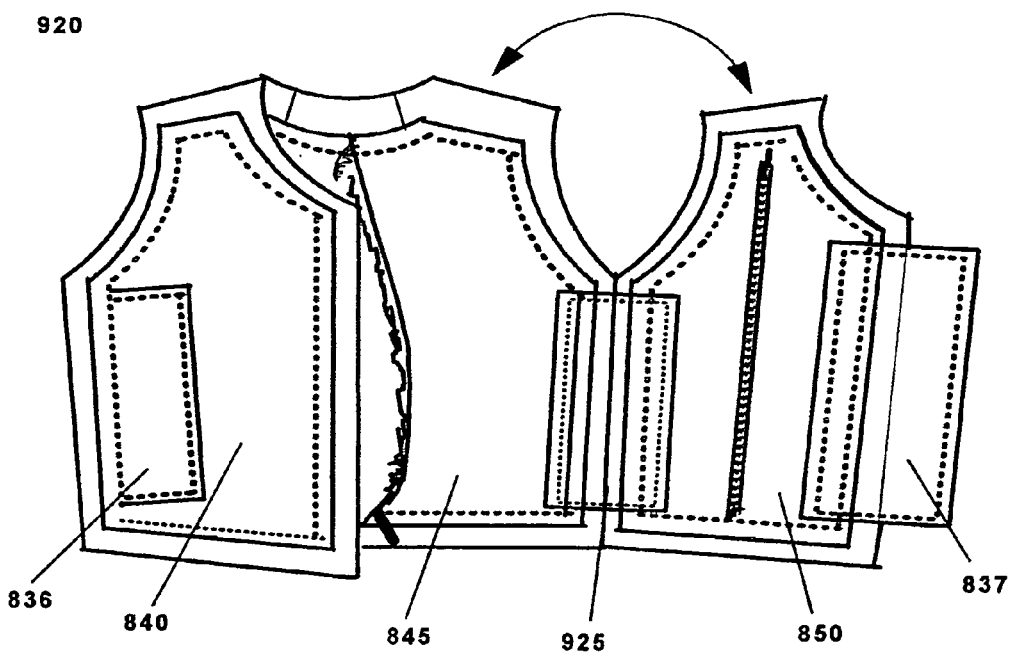

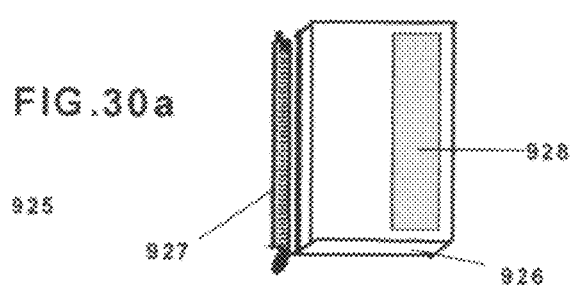
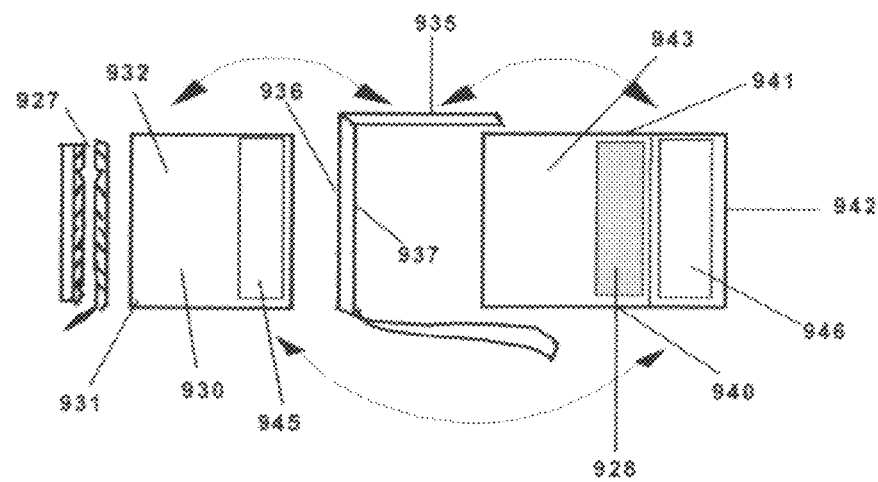
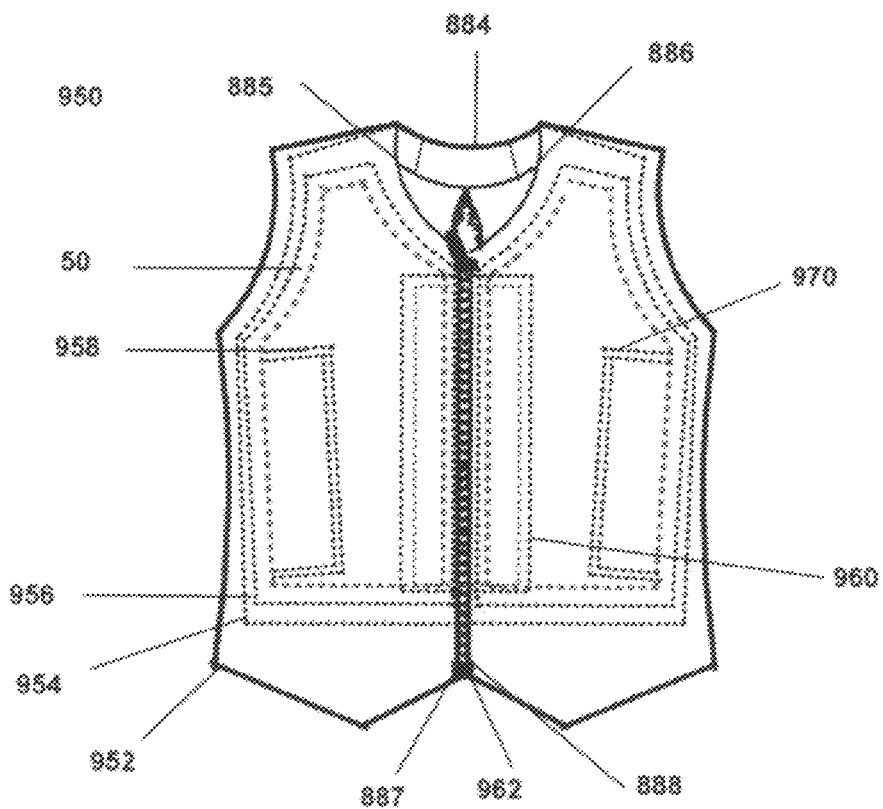

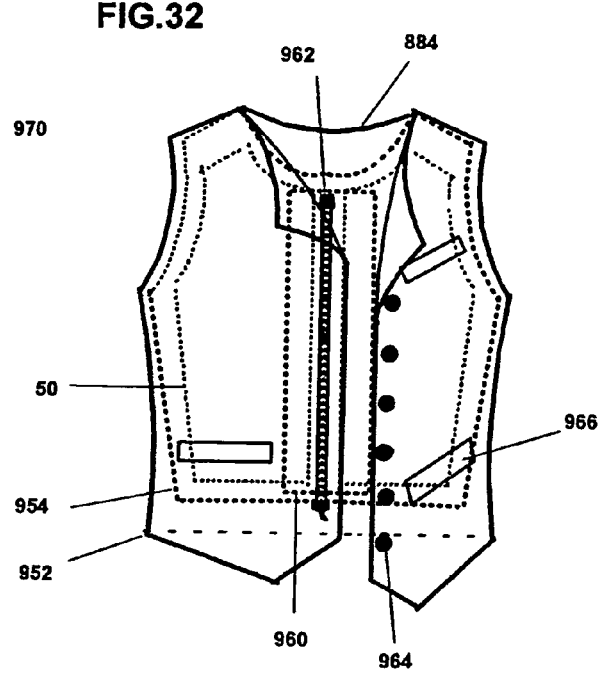
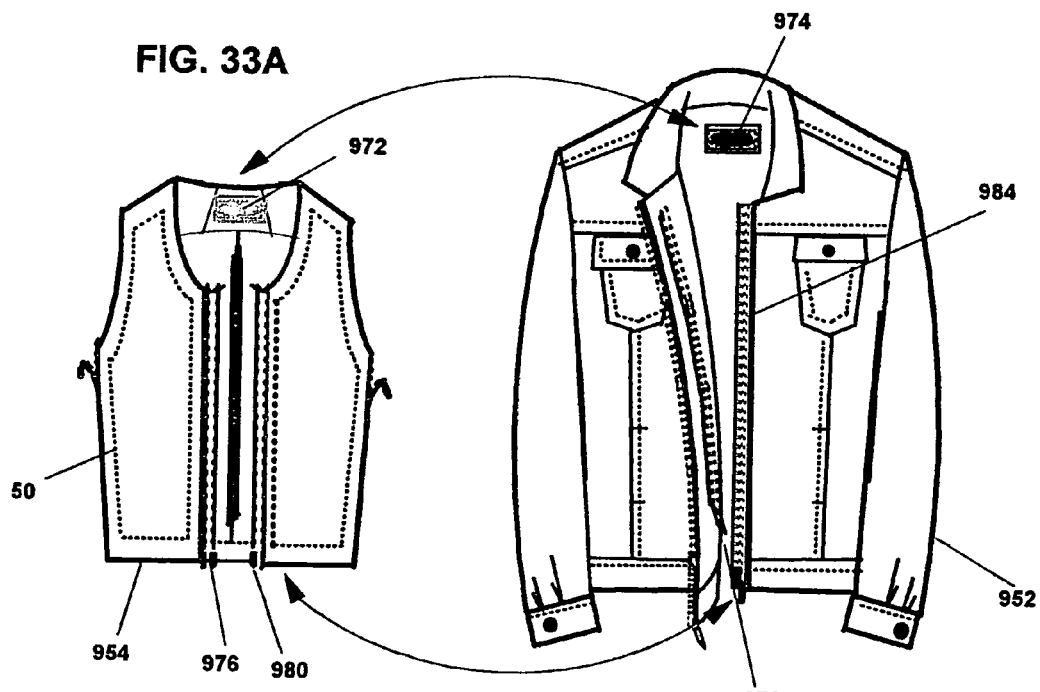

UNOBTRUSIVE HIGH-END READY TO WEAR CONCEALABLE BODY ARMOR

CROSS REFERENCE

The present application is filed as a continuation-in-part of U.S. patent application Ser. No. 12/462,306, entitled "UNOBTRUSIVE STYLISH WEARABLE APPAREL PROTECTION BODY ARMOR GARMENT VEST INCORPORATED INTO A READY TO WEAR ARTICLE OF CLOTHING AND METHOD OF FITTING AND MANUFACTURE A BALLISTIC PANEL CARRYING GARMENT" filed Aug. 3, 2009 by Martha Ellen Pearl et al.; and claims priority to U.S. Provisional Application No. 61/620,503 entitled "UNOBTRUSIVE HIGH-END READY TO WEAR CONCEALABLE BODY ARMOR GARMENT" filed Apr. 5, 2012 by Doo Kalmanson Aquino and U.S. Provisional application Ser. No. 61/852,142 entitled "UNOBTRUSIVE HIGH-END CONCEALABEL BODY ARMOR" filed Mar. 15, 2013 by Doo Kalmanson Aquino. Each of the above-noted documents is hereby incorporated by reference in their entirety.

FIELD OF INVENTION

The present invention relates generally to garments incorporating concealed body armor and the body armor concealed therein. In particular, the invention relates to high-end or seasonal wear with a discrete carrier shell to contain pliable protective panels integrated therein and three dimensional models thereof.

BACKGROUND OF THE INVENTION

Bullet resistant vests have been standard equipment for members of most state and local police departments. These vests are generally made of a fabric shell, usually of a woven material, containing compartments which house panels of impact absorbing anti-ballistic material such as Kevlar® (E.I. Dupont, Inc.), Spectra® (Allied Signal, Inc.), and Twaron® (Akzo, Inc.). The vests are designed to surround the torso of the wearer, at least from the neck to the waist, with a layer of the protective panels. For example, U.S. Pat. No. 3,973,275 to Blauer discloses a lightweight flexible garment intended to protect against unexpected handgun attacks. The vest incorporates a plurality of panels of Kevlar or similar soft, mid-flexible, ballistic fabric material enclosed within a durable outer covering. The panels are joined together using cinches, straps, and/or VELCRO® along the sides so as to permit the protective panels to encircle the wearer's torso. Routine use of these vests subjects the police officer to considerable inconvenience and discomfort. The police officer is required to wear the vest throughout the entire workday, usually beneath their standard police uniform shirt. The vests are stiff and constantly shift from the desired position, impairing the officer's appearance and undermining concealment of the vests. Further, when worn under a uniform the vests inhibit movement and air circulation and therefore lead to discomfort, restricted movement, and increased heat. Thus, the officers constantly readjust their uniforms to address these issues. Combined, these factors have led to a greater level of noncompliant or improper usage of the bullet proof vests by law enforcement than would normally be expected. Several bullet proof vest designs have attempted to improve upon the Blauer vest without success. For Example:

U.S. Pat. No. 4,266,297 to Atkins ("'297 patent") describes a ballistic panel carrier garment in the form of a shirt that permits its wearer to readily install and remove ballistic panels in to receptacles within the shirt. The receptacles are dimensioned to protect at least 75% of the upper torso of the wearer. The shirt as disclosed by '297 patent does not fully protect the upper portion of the wearer's shoulder and, in particular, the torso portion immediately beneath the wearer's arms.

U.S. Pat. No. 5,331,683 to Stones, et al. ("'683 patent") describes a protective body armor garment in the form of a vest that can be worn over or in place of a standard uniform shirt. Although the garment disclosed in the '683 patent attempts to maintain a degree of professional appearance while concealing the use of body armor, it does not fully protect the wearer's side torso.

U.S. Pat. No. 5,974,585 to Bachner Jr. ("'585 patent"), discloses a concealable protective garment having additional protection for the groin. The garment has an extended panel formed of an underlying garment which covers the frontal waist area of the wearer to overlie the frontal areas of the wearer. Various straps are used to maintain the panel in a secure position, and these straps constrict the movements of wearer and interfere with the design, style, and fit of the garment.

U.S. Pat. No. 6,233,737 to Ditchfield ("'737 patent") discloses a concealable ballistic vest having mating sides in a ball and socket configuration enabling the armor to be easily detached. The garment of '737 patent suffers from limitations on the sophistication of the wearer's ensemble and the increased heat build-up to the wearer.

U.S. Pat. No. 6,698,024 to Graves ("'024 patent") shows a bullet resistant garment with modular components such as arm pads and groin protectors containing ballistic material. However, the garment is burdensome to wear, obviously present, and not high end apparel at all.

U.S. Pat. No. 7,546,853 to Rock ("'853 patent") shows an advanced engineered garment with opposed fasteners pile connections on each side and at shoulder area to allow easy fastening. The garment lacks style and is quite bulky and uncomfortable to wear.

Approximately 100,000 Americans a year are victims of gun violence, nearly a third of whom are killed. It appears that these acts of gun violence are occurring on a greater scale. In light of perceived escalating violence, the civilian demand for bullet resistant garments is increasing exponentially. In particular, certain high profile individuals—such as executives, diplomats, bodyguards, celebrities, journalists, politicians, etc. who may reasonably believe that they are at risk of an unexpected attack by armed individuals—would benefit from bullet resistant garments that can be integrate into their wardrobe.

However, the above-noted drawbacks of bullet resistant vests in civilian law enforcement—bulkiness, discomfort, poor fit, fatigue after prolonged use, and impaired freedom of movement—are further magnified when such garments are considered for civilian use. In particular, lack of comfort and imperfect concealment of such garments are substantial hurdles to civilian adoption of the technology.

The bullet resistant garments of the prior art are uncomfortable and are therefore less likely to be incorporated into a civilian's daily wardrobe. In particular, the bulk and heft of prior art bullet resistant garments would considerably add to civilians' discomfort and would limit the amount of uninterrupted time a civilian could wear the garment. Further, since these prior art garments must be tightened around the wearer to provide protection they often prevent ventilation and moisture removal, especially in warm weather, further detracting from their comfort.

A uniformed police officer will maintain a professional appearance while wearing the same prior art ballistic armor, day after day, despite the bulk of the armor and its impaired concealment. However, a business person such as a banker or an executive wearing the same ballistic armor of the prior art would stand out among his or her colleagues. Thus, civilians require greater wardrobe flexibility than law enforcement and civilians place greater emphasis on a fashionable and seasonable appearance. Further, early adopters of the technology such as politicians, celebrities, athletes, etc. are particularly fashion-conscious and would be loath to risk the disheveled appearance likely with the use of today's bullet resistant garments. Moreover, there is a greater desire for concealability amongst the civilian population because publicly known use of a vest may invite unfavorable impressions such as cowardice or criminality by others. Known use amongst politicians or governmental leaders may lead to undue panic amongst the general public.

Also, with the increased numbers of women serving within the armed and civilian police forces, the issue of "fit" has arisen in relation to currently available body armor vests. In general, these vests are ill-suited to fit the curves of women and women are forced to wear larger sizes of body armor to accommodate their figures. This further enhances the discomfort of these garments for those individuals. Efforts to address these issues are illustrated within U.S. Patent Publication Nos. 20070234459 to Stewart and U.S. 20090255022. In both instances, the disclosures relate to body armor intended to fit the female form but in both instances the garments do not depart from the essential Blauer design and therefore, underlying issues of discomfort, poor fit, and lack of concealability are not addressed. In particular, the disclosure of Steward relates to a molded design wherein the flexibility of the protective panels would be adversely affected. U.S. Pat. No. 5,943,694 further discloses contoured body armor that implements radially-oriented darts; however, the darts are limited to one per layer and further add undesirable thickness to the vest.

Body armor manufacturers to date have failed to produce product lines that address the public's desire for body armor apparel which provides enhanced protective elements, integrates discretely into a fashionable wardrobe, and drapes comfortably so as not to impair their normal activities. In particular, a need exists for a garment that provides ballistic protection but has the appearance of ordinary every-day wear. The advantage would also be increased if that ballistic armor can take the form of formal, business, or casual attire to further suit the wearer's needs. A further advantage would be obtained if the armor could be contoured, given a three-dimensional shape, to accommodate the female form or that of other individuals.

The foregoing discussion is presented solely to provide a better understanding of the nature of the problems confronting the art and should not be construed in any way as an admission as to prior art nor should the citation of any reference herein be construed as an admission that such reference constitutes "prior art" to the instant application.

SUMMARY OF THE INVENTION

The current invention relates to a bullet resistant garment of a concealed carrier shell and an over-garment.

In one embodiment the invention is directed towards a pliable protective insert incorporating a plurality of layers of protective material that have an inner face and an exterior face and a shared edge; each layer of the plurality of layers has an independent finished edge and each independent finished edge is capable of moving relative to the finished edges of adjoining layers; the plurality of layers of protective material are bound by at least one tight attachment such that it does not impair the movement of the independent finished edges; and the insert defeats at least a National Institute of Justice 0101.06 class IIIA threat. In another embodiment, the pliable protective insert defeats at least a National Institute of Justice 0101.06 class III threat.

In a further embodiment, the pliable protective insert may further incorporate at least one loose attachment of the plurality of layers of protective material located near the shared edge of the plurality of layers of protective material. In a further embodiment, loose attachment may include a capped chain, bar, wire, and or cord greater in length that the thickness of the pliable protective insert or a length of fabric or material greater in length than the thickness of the pliable protective insert attached to the independent finished edge of each of the protective material layers within the plurality of layers of protective materials at intervals.

In yet another embodiment, at least one layer of the plurality of layers within the pliable protective insert incorporates at least one interconnecting seam in order to provide a three dimensional shape to the pliable protective insert, and in an additional embodiment the protective material layers incorporating the seams are closest to the inner face of the plurality of protective material layers. In a further embodiment, at least one layer of the plurality of layers of the pliable protective insert incorporates at least one dart in order to provide a three dimensional shape to the pliable protective insert. In a further embodiment, the same layer of the plurality of layers incorporates the interconnecting seam and the dart. Also, a further embodiment relates to a pliable protective insert where adjacent layers of protective material incorporate interconnecting seams or darts and the interconnecting seams or darts do not overlap.

In a further embodiment, an attachment is mounted on the exterior face of the plurality of layers of protective material of the pliable protective insert, and in a still further embodiment this attachment is a tight attachment. In yet another embodiment, the tight attachment may be a detachable attachment, and in a further embodiment the detachable attachment may be a base with at least one post and a means of capping the post. In a still further embodiment, the base of the detachable attachment may be a trauma plate.

In one embodiment, the protective material is a ballistic, penetrating, blunt force, and/or electroshock material. In certain embodiments, two or more different types of protective materials are included within the plurality of layers of protective material. In yet another embodiment, the protective material may be a ballistic or blunt force material and in a further embodiment the material may be a ballistic material. The plurality of layers of protective material may be between about 15-45 layers, in a further embodiment about 20-45 layers, and in a still further embodiment about 25-45 layers. In certain embodiments, the layers of protective material may be greater than 45.

The current invention is further directed to a carrier shell for a protective insert having at least two support panels, a first support panel and a second support panel, wherein each support panel may be made of an inner layer, a trim binding layer, a facing layer and a backing layer that create a pocket capable of accommodating a protective insert and provide an opening to the pocket; at least two seams join the at least two support panels; at least one opening to the carrier shell to assist an individual in donning the carrier shell; and at least one detachable carrier panel capable of containing a second protective panel positioned in an overlapping relationship with at least one seam.

In a further embodiment of the carrier shell, a third support panel of similar construction is provided. In yet a further embodiment, the support panels include an outer layer.

In yet another embodiment of the current invention one or more of the support panels incorporate at least one dart or interconnecting seam to provide carrier shell with a three dimensional shape.

The support panels in certain embodiments of carrier shell may have the opening located within inner layer, and in other embodiments the opening may be located within the trim binding layer.

The carrier shell may have an outer layer applied on an exterior face of the carrier shell to provide a clean finish to the carrier shell.

In a further embodiment, the carrier shell may be integrated into an outer-garment through at least one attachment. In another embodiment, the attachment may be a permanent or temporary attachment. In a further embodiment, the attachment is temporary and in a still further embodiment the temporary attachment may be selected from the group consisting of zippers, pile fasteners, hook and loop fasteners, adhesive fasteners, snaps, buttons, and hooks.

The invention is further directed to a method of assembling support panels wherein the method of assembling a support panel for a carrier shell comprised of the steps of using a fusible interfacing material to bind one layer of support panel to another. In a further embodiment of the method of the current invention additional edge and/or top stitching in applied near interlayer seams, i.e., inner layer seam, facing layer seam, etc.

These and other aspects of the present invention will be better understood by reference to the following detailed description and accompanying figures.

DESCRIPTION OF THE DRAWINGS

FIG. 3 is a close-up view of the outer edge of one of the protective material layers of the pliable protective panel of the current invention.

FIG. 4 is a rear view of a pliable protective panel of the current invention.

FIG. 5 is an exploded view of a series of protective material layers with ballistic discs mounted thereon.

FIG. 6 is a top down view of the arrangement of the ballistic discs within FIG. 5.

FIG. 7 illustrates a pliable ballistic panel incorporating ballistic disc protective layers.

FIG. 8 illustrates the assembly of a pliable ballistic panel incorporating ballistic disc protective layers.

FIG. 9 is a front view of a first contoured pliable layer of protective material illustrating the use of seams and darts thereon.

FIG. 10 is a front view of a second contoured pliable layer of protective material illustrating the use of seams and darts thereon.

FIG. 11 is an exploded view illustrating how the first contoured pliable layer of protective material of FIG. 8 and the second contoured pliable layer of protective material of FIG. 9 may be assembled into a pliable protective insert.

FIG. 12 is an exploded view of a series of contoured layers of pliable protective material for a bodice.

FIG. 13 is an exploded view of a series of contoured layers of pliable protective material for a bodice.

FIG. 16 is an exploded view of a series of contoured layers of pliable protective material for a front side panel.

FIG. 17 is an exploded view of the assembly of the layers of ballistic disc protective material for a front side panel.

FIG. 20 is an exploded view of a three dimensional support panel of a carrier shell.

FIG. 21 is an exploded view of an alternative embodiment of a three dimensional support panel of a carrier shell.

FIGS. 22A and 22B provide an exterior and interior view, respectively, of an assembled support panel of a carrier shell.

FIG. 23 is an interior view of a partially assembled carrier shell.

FIG. 26 is an interior view of a partial assembly of carrier shell having a side opening for insertion of pliable protective inserts.

FIG. 27 is an exterior view of an assembled unfinished carrier shell of the current invention.

FIG. 28 is an interior view of an alternative embodiment of a finished carrier shell of the current invention.

FIG. 29 is an exterior view of a finished carrier shell with front right side support panel undone to illustrate the use of removable panels to cover seams and openings.

FIGS. 30A and 30B provide a perspective and an exploded view, respectively, of a removable panel of the current invention.

FIG. 31 provides an exterior view of a carrier shell integrated into an outer garment with carrier shell and pliable protective inserts shown in phantom.

FIG. 32 provides an exterior view of an alternative embodiment of bullet resistant garment of the current invention where carrier shell and outer garment are integrated through rear neck line with carrier shell and position of pliable protective inserts shown in phantom.

FIGS. 33A and 33B illustrate a finished carrier shell and outer garment, respectively, with mated members of a detachable attachment permitting temporary integration of carrier shell and outer-garment.

DETAILED DESCRIPTION

Detailed embodiments of the present invention are disclosed herein; however, it is to be understood that the disclosed embodiments are merely illustrative of the invention that may be embodied in various forms. In addition, each of the examples given in connection to the various embodiments of the invention is intended to be illustrative, and not restrictive. Further, the figures are not necessarily to scale, and some features may be exaggerated to show details of one embodiment's components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Figure 1:
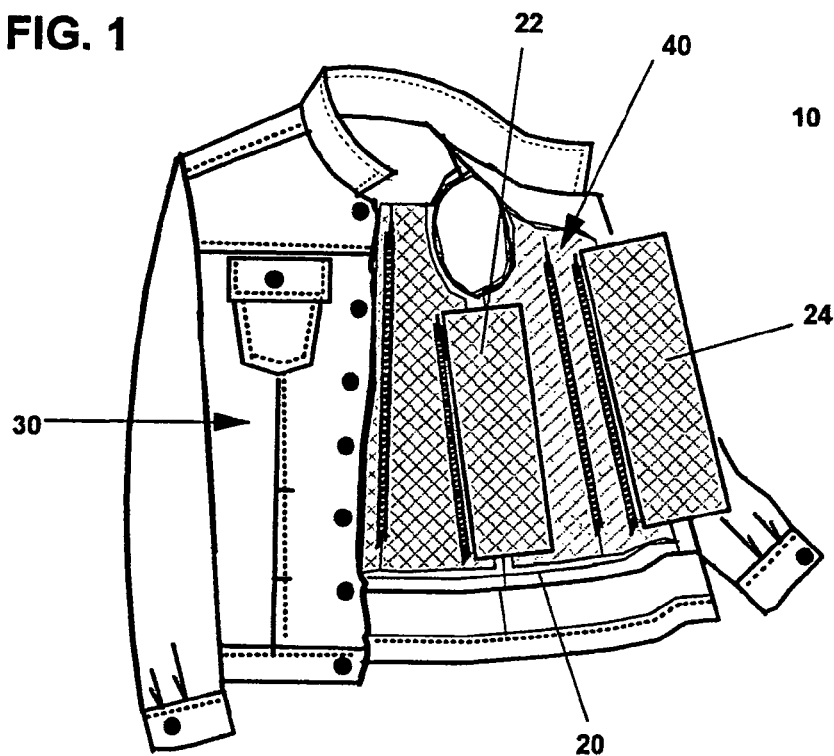
FIG. 1 is a front view of a bullet resistant garment, carrier shell and over-garment in accordance with the current invention.

FIG. 1 illustrates a concealable body armor garment 10 of the current invention which is constructed of a pliable protective panel (not shown in FIG. 1) insertable into a support panel 40 of a carrier shell 20 which is integrated, permanently or detachably, into an outer-garment 30. The concealable body armor of the present invention provides a greater ability to incorporate the wearer's own style into their protective garments by permitting the underlying carrier shell to be incorporated into numerous types of garments including high-end garments. In its detachable embodiment the invention allows the wearer to replace the outer garment to keep up with seasonal needs and fashion trends. This is made possible through the use of (a) standardized base structures (slopers) for garments, such as torso sloper for the carrier shell which permits the carrier shell to be used with like garments, i.e. jacket, coat, blazer, shirt and/or vest manufactured on the form of a single torso sloper, without impairing the fit and appearance of the garment or comfort of the wearer;

(b) semi-elastic binding used to trim pockets/receptacles within support panels of the carrier shell and conform to the pre-determined thickness of a pliable ballistic panel having a desired level of threat protection thereby minimizing friction within the receptacle while permitting enough flexibility in support panels to accept upgrades in the protection levels of the panels as needed;

(c) pliable protective panels smaller in size than the receiving pocket/receptacle of the carrier shell which allow the side and bottom edges of the pliable protective panel to bend freely following the contour of the wearer's body;

(d) contoured layer(s) of pliable protective materials so that when assembled into a pliable protective insert represent a form fitting three-dimensional contour of the wearer's body; and (e) loosely draped engineering and construction of the combined garment: i.e., the carrier shell is draped independently from the outer garment and semi-fitted to the wearer's body.

This construction minimizes folding, creases and bulging around waist area, side area, armhole area, and shoulder area, thereby facilitating internal freedom of movement for the wearer without distorting the overall fit, shape and style of the outer garment.

All terms used herein are intended to have their ordinary meaning unless otherwise provided.

The term 'ballistic protection' as used herein refers to the ability to resist the force of a projectile, such as a bullet. In certain embodiments this may be determined on the basis of tests conducted under local, state, national, or international standards such as those promulgated by U.S. National Institute of Justice (Ballistic Resistance of Body Armor NIJ Standard-0101.06 by Office of Law Enforcement Standards, National Institute of Standards and Technology July 2008), UK Home Office Scientific Development Branch, German Police (TR-Technische Richtlinie), ISO (peEN ISO 14876); and/or Underwriters Laboratories (UL Standard 752). For example, protection may be determined on the basis of tests conducted taking into account the United States' NIJ specifications (which take into consideration the definition of the ammunition, weight of the bullet, the minimum speed required to effect the test). On the basis of these specifications, for example, protection class I is the lowest, with the speed of the bullet as it leaves the weapon registering 259-320 m/sec., class IIIA envisages a bullet speed of 259-373 m/sec., class III envisages a bullet speed of 426 m/sec, up to class IV, in which the speed of the bullet is approximately 870 m/sec. Protection from the blunt force trauma resulting from projectile impact may also be included within understanding of protection. This aspect of projectile impact (backface signature—impact energy transmitted to the wearer) may be assessed in accordance with the above-noted standards as well. In certain embodiments of the current invention the garments may have protection equivalent to about class III or higher of the NIJT standards.

As used herein, "protective materials" may include any material capable of resisting any mortal or incapacitating threat to the wearer of the protective material. In certain embodiments, the protective materials are pliable or semi-pliable. Protective materials may include, but are not limited to, ballistic materials, blunt force trauma materials, piercing materials, and or electroshock materials.

"Ballistic materials," as used herein, refers to materials capable of resisting impact from a projectile. In one embodiment the ballistic materials are pliable and ballistic fibers in particular are contemplated. Ballistic fabrics are those formed from high tenacity fibers. High tenacity fibers are generally defined as having a tenacity of at least ten grams per denier. High tenacity fibers include liquid crystal fibers. This would include both lyotropic and thermotropic liquid crystal fibers. A mere illustration of a type of thermotropic liquid crystal fiber is a fully aromatic polyester and a mere illustration of a lyotropic liquidcrystal fiber would be an aromatic polyamide (polyaramid). An example of a fully aromatic polyester fiber is VECTRAN® manufactured by Hoechst Celanese Corporation and described in U.S. Pat. No. 4,479,999. An example of an aromatic polyamide includes high modulus aramid fibers such as poly (para-phenylene terephthalamide). Such high modulus fibers are hereinafter known as HM-aramid fibers. An example of a HM-aramid fiber is KEVLAR® manufactured by E. I. du Pont Nemours and Co. and described in U.S. Pat. No. 4,198,494. Other high tenacity fibers include Dyneema (DSM), Gold Flex and Spectra (Honeywell), Twaron (Teijin Twaron), Dragon skin (Pinnacle Armor), Zylon (Toyobo), graphite, nylon, glass, high molecular weight polyvinyl alcohol, high molecular weight polypropylene, high molecular weight polyethylene, and the like. In many applications, the fibers are used in woven or knitted fabric. For other applications, the fibers are encapsulated or embedded in a composite material. Some composite bonding compounds include matrices of olefin polymers and copolymers, unsaturated polyester resins, epoxy resins, and other resins curable below the melting point of the fiber. Other bonding compounds include phenolic/polyvinyl butral resin matrices, interstitial resin, elastomer matrices, among others. An example of a network of high modulus fibers coated with a matrix of elastomer is manufactured by Allied Corporation and described in U.S. Pat. No. 4,623,574. In certain embodiments, the inventors herein have found protective materials such as woven and non-woven layers of ultrahigh molecular weight polyethylene sold under the trade name SPECTRA SHIELD® manufactured by Honeywell Group useful. SPECTRA SHIELD® is formed of a series of individual layers of four plies of unidirectional SPECTRA® fibers cross plied at 0°/90°/0°/90° and sandwiched in a thermoplastic film. In certain embodiments of this invention, each sheet of SPECTRA SHIELD®, and similarly constructed ballistic protective materials, may be considered a layer of protective material as disclosed further below.

Additionally, ballistic material may include flexible ceramic, metal and/or composite arrays such as those produced by Pinnacle Armor of Fresno, Calif. (Dragon Skin™), see also U.S. Pat. Nos. 6,035,438; 6,170,378; 6,745,661; and 6,705,197. Typically, discs (circular, hexagonal, octagonal, or otherwise shaped) of ballistic material: ceramic (such as silicon carbide ceramic matrices), metal (such as titanium), or composites thereof, are arranged in an overlapping arrangement similar to scale armor, thereby creating a flexible vest that allows a good range of motion and can allegedly absorb a high number of hits compared with other body armor. See also U.S. Pat. No. 7,556,855. Further protective materials related to advances within the field such as shear thickening liquids as disclosed within European Patent Nos. EP2324910 and EP1633293 and/or the like may be used within the current invention.

"Blunt force protective materials," as used herein, refers to materials capable of resisting blunt force trauma. In certain embodiments, the term refers to materials that can reduce and or dissipate the blunt force resulting from a projectile strike—i.e. reduce the back face signature of the projectile. Such materials may include but are not limited to, those disclosed in European Patent publication No. 2515067A1; European Patent Publication No. EP1299684A2; U.S. Pat. No. 6,189,157; European Patent Publication No. 1766320A1; European Patent publication no. 1902271, and/or the like.

"Piercing protective materials," as used herein refers to materials capable or resisting cutting or puncturing weapons or traumas. Such materials may include, but are not limited to, those disclosed in European Patent publication No. 0912117B1; US Patent Publication No. 20120246788; European Patent Publication No. EP1358376A2; European Patent Publication No. 1766320A1; European Patent publication no. 1902271, and/or the like.

"Electronic protective materials," as used herein, refers to materials capable of resisting electric shock or stun weapons or related traumas. Such materials may include electronic conductive fabrics such as high performance silver mesh fabrics, materials disclosed within Patent Publication No. US2006175581 and/or the like.

The term "projectile" utilized in this application is preferably a bullet; however, any number of analogous projectiles such as fragments, flechettes, and so forth may also be considered projectiles.

A. Pliable Ballistic Panels

Figure 2:
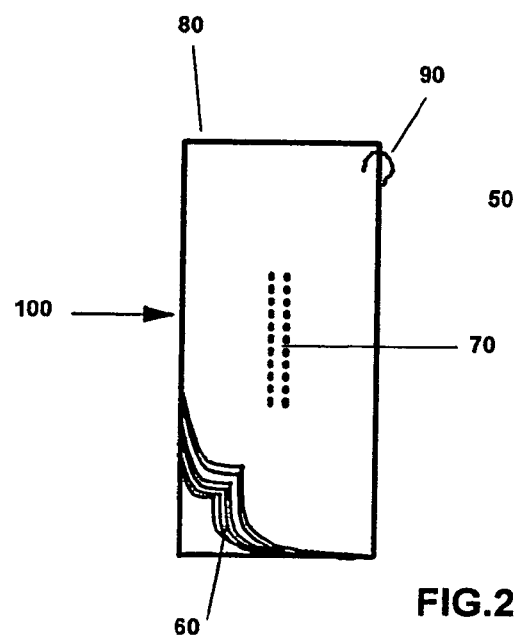
FIG. 2 illustrates a pliable protective panel of the current invention.

FIG. 2 illustrates a pliable protective insert 50 of the current invention. Pliable protective insert 50 is comprised of several layers of protective material 60, permanently, semi-permanently, or detachably connected at one or more tight attachments 70. In some embodiments, a loose attachment 90 may be provided at the corners 80 of pliable protective panel 50.

Each protective material 60 may be selected to provide the desired type and level of protection against a known or perceived threat. Thus, layers may be selected to provide protection against known or perceived threats including, but not limited to, ballistic, blunt force, piercing, or electrocution and/or shock. To a lesser extent, but still contemplated by current invention, materials may be incorporated to protect the wearer against perceived or known chemical, radiation, fire, environmental (heat/cold/wind/water) threats and the like. In certain embodiments, protective material 60 may be a material selected to protect against ballistic, blunt force, piercing, and/or electrocution/shock threats and/or traumas. In certain embodiments, one or more materials that protect against one of the above-noted threats may be excluded. In a further embodiment, the materials may be selected to protect against perceived or known ballistic threats and/or blunt force trauma resulting therefrom, and further may be selected to protect against level II, level IIA, level IIIA, level III, level IV and/or level V ballistic threats based on the NJIT standards and or equivalents. When selecting protective materials for body armor for use by civilians, high profile executives, security officers, or government employees, comfort, flexibility, and concealability are among the factors to consider. Although, any protective material known to protect against the desired known or perceived threat may be used, in certain embodiments protective material providing ballistic protection is preferred. In further embodiments, the ballistic protective material may be ultrahigh molecular weight polyethylene sold under the trade name SPECTRA SHIELD® manufactured by Honeywell Group.

The pliable protective insert of the current invention may consist of a plurality of layers of protective material 60, having an interior/inner face (the side closest to the wearer when insert is used), an exterior/outer face (the side furthest from wearer when insert is used), and a peripheral/exterior edge. Each sheet/layer of protective material 60 in the plurality of layers is in parallel contact with at least one adjoining sheet/layer of protective material. Each sheet/layer of protective material 60 has an interior facing side (side of material facing into wearer when insert is used) and an exterior facing side (side of material facing away from wearer when insert is used) and a peripheral/exterior edge. For ease of reference, layers of protective material intended to be closest to wearer shall referred to herein as interior/inner layers and those intended to be furthest from wearer will be referred to as exterior/outer layers.

Although FIG. 2 illustrates a pliable protective insert with seven (7) layers, one of ordinary skill in the art will recognize that the number of layers of protective material 60 provided should, at a minimum, be the number of layers needed to protect against the desired perceived and/or known threat. Thus for example, if the garment is intended to provide protection from a ballistic threat enough layers of protective material, inclusive of ballistic protective material and/or other protective materials, should be present to provide protection against the ballistic threat. Similarly, if protection is needed against a piercing threat enough layers of protective materials should be provided to meet that threat. It will be understood that in certain instances a perceived threat may be protected against without actually incorporating a protective material specifically designed to meet that threat. Thus, a garment of the current invention, by virtue of the layers provided or structure of the garment, may protect against a piercing threat even though piercing protective materials are not included within pliable protective insert 50. In certain embodiments, where layers of woven and/or non-woven pliable ballistic materials, such as KEVLAR® and the like, about 15 to 45, about 20-45, and/or about 25-45 layers may be needed. In yet another embodiment, greater than 45 layers of protective materials may be contemplated. In other embodiments, where ceramic, metal or composite materials are incorporated, fewer layers may be used to achieve the desired protection—for example, about 10-20 layers, about 11 to 19, or about 12-18 layers to meet the same level of ballistic/projectile threat as the Kevlar noted above. In certain embodiments, protective materials of varying different compositions and different ballistic profiles some protect against level II, IIA, III, IIIA, IV, or V threats, or have no ballistic protective attributes) may be used so long as the cumulative effect of the layers of protective materials is sufficient to generate a pliable protective panel 50 that protects against the desired threat level. The protective capabilities of assembled garments may be confirmed using NJIT test protocols noted above as well as other national and governmental standardized tests for ballistic/projectile threats. It will be appreciated that government and industry standardized testing methods may also be used to assess to the garment's ability to withstand other threats such as blunt force, piercing, electrocution/shock, etc. Further, as depicted, a layer of protective material 60 is a single sheet of protective material, although it may be understood that one or more sheets of protective material 60 may be joined separate and apart from tight attachment 70 and loose attachment 90 detailed below so as to form or be considered a layer, provided that it does not substantially impair flexibility of pliable protective insert and in no embodiment are all sheets of protective material joined in such a fashion as to be considered a single layer. In certain embodiments, two, three, and/or 4 sheets of protective material 60 may be attached so as to form or be considered a layer, although in the most preferred embodiment of the current invention each sheet of protective material 60 is considered a layer.

Tight attachment 70 serves to hold the layers of protective material 60 together in a tight relationship, i.e., layers of protective material cannot move laterally with regard to one another. In certain embodiments, a sole tight attachment may be used to secure layers, as shown within FIG. 2. However, numerous other tight attachments may be used to secure layers of protective material, and or a larger area of pliable protective insert 50 may be used to provide a tight attachment, provided that the increased numbers or areas of tight junctions do not interfere with the pliability of pliable protective insert 50. In certain embodiments, 2, 3, 4, 5 or more tight attachments may be provided. As shown in FIG. 4, attachment 110, which in some embodiments may be one half of a mating attachment, may be provided to attach and properly position pliable ballistic panel 50 within support panel 40. Attachment 110 may include but is not limited to hook-and-loop connectors (VELCRO™), adhesive strips, zippers, buttons, magnets, snaps and the like. Tight attachments may be provided at attachment 110 to properly anchor attachment 110 to pliable protective insert 50. In further embodiments, the area of the tight attachment(s) may be less than or equal to 50%, less than or equal to 40%, less than or equal to 30%, less than or equal to 20%, less than or equal to 10% of the surface area of the pliable ballistic panels. As noted above, these tight attachments should not interfere with the pliability of pliable protective insert 50 nor should the tight attachments interfere with the ability of layers of protective material to move laterally relative to one another at edges 100 of pliable protective insert 50. The tight attachments should be at least about 0.5 inches, 0.75 inches, 1.0 inches, 1.25 inches, 1.5 inches, and/or 2.0 inches from the peripheral edge of pliable protective insert 50.

Tight attachment 70 may be a permanent, semi-permanent, and/or detachable attachment. FIG. 2 illustrates a semi-permanent attachment as layers are tightly attached using a series of rows of single needle top stitching along the center of the panel. Such stitches may be undone without damaging and or impairing protective materials 60. The selection of type, placement and number of stitches or like semi-permanent attachment means necessary to achieve a tight attachment are within the skill of one of ordinary skill in the art. Permanent attachments, attachments that bond layers of protective material 60 in such a fashion that the layers of protective materials cannot be separated without damaging or impairing protective materials 60, are also contemplated. Such permanent attachments may be achieved by chemical, adhesive, heat bonding and/or welding and like means. Lastly, in certain embodiments it may be desired to have a detachable tight attachment so as to permit the various layers of protective material 60 to be removed, replaced, and/or modified during construction of the garment (i.e. to correct cut, fit and or tailor) or afterwards (i.e. replace damaged sheets/layers, insert protective materials having different capabilities, insert protective materials to upgrade level of protection, incorporate other functionalities such as RFI tags, electronics such as locators, GPS devices, etc.). Such detachable attachments may include but are not limited to clamps, brackets with caps and or screws, posts and bases with caps and screws, and/or other appropriate means known in the art. For example, each of the sheets/layers of protective material may be provided with one or more holes/openings at the area where the tight attachment is intended. Each of the sheets/layers could then be inserted over the posts of the brackets and or post/base portions of the detachable attachment. Once the desired number of sheets/layers of protective material has been reached, the post or bracket can be capped—caps, screws, pins, etc., (as used herein cap may be used to refer to listed and known items suitable for tightly securing protective materials on posts or brackets in a detachable manner) may be attached, screwed, or inserted into the post thus achieving the tight attachment. When a modification is desired, the caps, screws, pins, etc. are removed and the sheets/layers may be removed from the posts to achieve the desired modification. In certain embodiments the posts may be attached to what would be considered a trauma plate, a thick ceramic or metal plate provided to protect vital organs, and the detachable tight attachment can be positioned so that it covers a vital portion of the wearer's anatomy: heart, kidneys, lungs, etc. Thus, a heightened level of protection may be achieved while providing for the tight attachment. As noted above, each of the permanent, semi-permanent, and/or detachable attachments should be placed so as not to interfere with the flexibility of pliable protective insert 50.

The proper form, fit, and appearance of the overall ballistic garment of the current invention is due in part to the edge arrangement of protective materials 60 within pliable protective insert 50. Layers of protective material 60 are permitted to move relative to one another, sliding over one another or separating from one another (i.e. creating space between layers), at the edges of pliable protective insert 50, such as edge 100. This arrangement permits pliable protective insert 50 to adjust to wearers movement and provide some give, bendability and movement, at the edges of the pliable protective panel. Further, it is believed that some air may become entrapped in the spaces between the sheets/layers of protective material which may thereby provide some cushioning against ballistic impact. The molded, pressed, cured or laminated ballistic panels previously used in this field do not provide this give at the edges; thus, when movement occurred the panels shifted and displaced the carrier shell disrupting the fit and/or positioning of the protective garment and the fit, comfort and appearance of any over-garment. The give in the pliable protective insert 50 prevents and/or mitigates the potential for this occurring, i.e. the pliable ballistic insert does not transfer the force of the wearer's movement to the carrier shell and/or over-garment so as to disrupt the comfort, fit, function, and/or concealability of these garments.

FIG. 3 illustrates the peripheral edge of protective material 60. In certain embodiments of the invention, the peripheral edge of one or more, and preferably all layers, are provided with some form of finishing which may include, but is not limited to, machine finishing (serger and/or merrowing), for example a 4 mm and 6 mm two-thread wrapped edge overlock (narrow & wide) 1-needle; 2-thread stitch or a 4 mm and 6 mm-3 thread overlock (narrow & wide) 1-needle, and 3-thread stitch is used for over-edging and seaming the raw edges of the protective material, such as a woven material or pliable ballistic, or any combination thereof of appropriate stitching method known in the art; heat finishing such as by melting threads at peripheral edges to provide smoothing; covering, such as by providing a strip of material folded over the peripheral edge and secured in place by stitching, adhesives, heat and or chemical bonding, or other means known in the art; and any combination thereof. A finished edge 125 prevents the unraveling, rolling, or curling of any loose thread of protective material 60 which may threaten the weave integrity and/or protective capability of protective material. Further, finished edge 125 assures the smooth movement of the layers of protective material 60 relative to one another providing the give/flexibility necessary to accommodate the wearer's movement as there is no risk that frayed ends of the protective materials will become intertwined or that rough edges will catch on the adjoining protective materials. Additionally, finished edge 125 assures that the threads of the protective material 60 will not become stuck on portions of the protective garment such as attachments (attachment 110 for example) such as hook and loop connectors.

In certain embodiments, one or more loose attachments 90 may be provided at one or more points along the peripheral edge of the pliable protective insert to connect the layers of protective material 60. Loose attachment 90 secures the layers/sheets of protective material in stacked relationship (i.e. relatively parallel to one another) and prevents layers from folding over themselves or moving out of position to a degree that the desired level of protection is no longer provided at the edges of the pliable protective insert because the desired number of layers of protective material is no longer available at that portion of the pliable protective insert. The loose attachment does permit the sheets/layers of protective material to move relative to one another in such a fashion as to accommodate movements of the wearer, carrier shell, or outer-garment. Thus, the pliable protective insert is able to isolate each of these from the forces of the other i.e. wearer's movement may not be transferred to outer-garment through movement of insert and/or movements of outer-garment will not necessarily be transferred to wearer. The loose attachment should provide for protective materials to move at least about 0.25 inches, about 0.5 inches, about 0.75 inches, about 1.25 inches, and/or about 1.5 inches in the lateral and/or vertical direction relative to one another. This permits the edges of the pliable protective insert to bend, fan out, and or stretch as needed to account for movement of wearer, carrier shell, and/or outer-garment. Such loose attachments may include a loop stitch or similar loop as illustrated in FIG. 2 in one embodiment. In another, the use of a thread, cord, wire, chain, etc. greater in length than the thickness of pliable protective insert 50 by at least about 25%, about 33%, about 50%, about 66%, about 75%, about 100%, about 150%, and/or about 200% is contemplated. The thread, cord, wire, chain, etc. would be inserted through the sheets/layers of protective material. Each end of the thread, cord, wire, chain, etc. would have caps, knots, screws, balls, discs, tabs, of greater thickness than that of the thread, cord, wire, chain, etc. to prevent the layers/sheets of protective material from sliding off the thread, cord, wire, chain, etc. An example of this arrangement would be similar to the plastic attachments used for putting price tags on articles of clothing and or the chains used to attach paint chips or other samples together. In a further embodiment, a piece of ribbon, swath of cloth, fabric, and/or suitable material greater in length than thickness of pliable protective insert, by at least about 25%, about 33%, about 50%, about 66%, about 75%, about 100%, about 150%, and/or about 200% may be used to form a loose attachment. The material may then be attached to each sheet of protective material at intervals, consistent or variable. The attachments preferably occur at or near the area of the same peripheral edge of each sheet/layer of the protective material, and the interval between attachments should be long enough to provide the desired amount of movement between layers. Loose attachments may occur at corners in the sloper pattern and along midpoints of longer straight edges but may be placed where ever their positioning may benefit the structure and integrity of the design. The number of loose attachments should not interfere with ability of protective material sheets/layers to move relative to one another as noted above. In certain embodiments, about 4 to 30 loose attachments may be used, in other embodiments 6 to 25 and in yet others 8 to 20.

FIGS. 5 and 6 illustrate an alternative embodiment of the protective material sheet/layers of the current invention. FIG. 5 shows three layers of protective material 60: top layer 130, middle layer 140, and bottom layer 150. On each layer a series of protective ballistic discs are attached: first set of ballistic discs 160 on top layer 130, second set of ballistic discs 170 on middle layer 140, and third set of ballistic discs 180 on bottom layer 150. As shown in FIG. 5 each disc on each layer is arranged edge to edge and the arrangement of discs between layers is offset—second set of discs 170 is shifted to the right of the first set of discs 160 and third set of discs 180. This is done to provide overlapping protection by the discs, as illustrated in FIG. 6, second set of discs 170 covers gap 165 between ballistic discs within first set of discs 160, and third set of discs 180 covers gap 175 between discs in second layer of discs 170. The discs themselves may be of sufficient shape and size to provide protection that conforms to the wearer's body without impairing the flexibility of the pliable protective insert. Shapes include circular, oblong, elliptical, oval, polygonal (hexagonal, octagonal, etc.), or other suitable shapes. In certain embodiments circular is used. Further the shape of the ballistic discs should be about 0.25 inches to about 2.5 inches across, or about 0.5 inches to 2.0 inches across. In certain embodiments, they may be about 0.25, about 0.33, about 0.5, about 0.66, about 0.75, about 1.0, about 1.25, about 1.33, about 1.5, about 1.66, about 1.75, about 2.0, about 2.25, about 2.33, and about 2.5 inches across. Inches across refers to diameter and/or width of the ballistic disc. Each of the discs within a set of discs or between layers of discs can be of a different shape and/or size. In one embodiment, each successive set of discs is larger in size. Thus, first set of discs 160 may be 0.5 inches across, second set of discs 170 may be 1.0 inches across, and third set of discs 180 may be 1.5 inches across. The discs may be attached to underlying protective material 60 by suitable means known in the art that will not substantially impair flexibility of the pliable ballistic insert such as stitching, adhesive, straps, welds, etc. In further embodiments, the layers with ballistic discs may include greater than three layers and in additional embodiments the layers with ballistic discs need not appear sequentially but may be interspersed amongst protective material layers without ballistic discs attached so long as increased ballistic protection or comfort is achieved without impairing the flexibility of the pliable protective insert or fit or comfort of overall bullet resistant garment.

FIG. 7 illustrates an embodiment of the pliable protective insert having ballistic discs 160 incorporated therein/on demonstrated in a rectangular panel (190). Rectangular panel 190 may be useful to protect the center, side, and back of the wearer in detachable carrier panels further disclosed below. In FIG. 8 the construction of rectangular pliable protective panel 190 is illustrated. As described herein, the rectangular panel is comprised of a first or exterior facing assembly 200 and an inner or inward facing layer 210. Exterior facing layer 200 has protective material 60 bonded to ballistic discs, titanium metal, 160 which are configured to cover the entire rectangular surface area of rectangular panel 190. Exterior facing assembly 200 and interior facing assemble are attached through use of tight attachment 70 and/or loose attachment 90 as disclosed above.

A further embodiment of the current invention relates to a contoured pliable protective insert and the construction thereof. In certain embodiments, a torso frame carrier shell vest and like garments may include a pliable protective insert that is three dimensional in shape. This three dimensional shape or contour may be achieved through the use of various dart manipulations and interconnecting seams, as shown in FIGS. 9-17. FIGS. 9 and 10 illustrate individual inner layers (closer or closest to the body) of protective material layers 220 and 230, respectively. Each layer, 220 and 230, is cut to a front pattern similar to that of a bodice. In the illustrated embodiment, FIG. 9 layer 220 incorporates an empire waist dart 240, interconnecting seam 245, and a fitted yoke at waist 250 across the front of the chest. The excess darted material may be softly draped and smoothly flattened towards apex point 255 and the excess fabric may be gradually shaped down towards waist to form a dart 240. The dart originates approximately 1.0 to 1.5 inches from apex point 255. Mid rib fitted yoke 250 is an interconnecting seam that accommodates the shape of the female body and captures its fullness without pressing upon or distorting. This may be accomplished by replacing lower portion of darted protective material layer 220 with an un-darted portion of same or similar protective material patterned on outer edge of removed portion of protective material layer 220, i.e. a yoke. Thus the contour of the garment is maintained without the addition of bulk to the garment FIG. 10 also shows an empire waist dart 260 in which the interconnecting seam 265 is one inch below the position of the interconnecting seam 245 of the first layer 220. This allows the interconnecting seams (245 and 265) to provide support and keep the appropriate form: i.e. less bulk, thereby keeping the outer surface of the pliable protective insert smooth. When first layer 220 and 230 are placed in an overlaying relationship as seen in FIG. 11, interconnecting seams 245 and 255 do not add any undue bulk. As shown, first layer 220 and second layer 230 can overlay in any sequence thereof with the darts and interconnecting seams facing each other with the dart tails in an opposite direction. In arranging the materials in this manner the surfaces of both the first layer 220 and second layer 230 remain smooth. The raw edge of the interconnecting seam may be reinforced with an overlocked or merrow stitch.

FIG. 12 further illustrates a method of providing contour to a bodice through dart manipulation. As shown, pliable protective insert 50 has five layers (from outer to inner layer: 280, 290, 300, 310, and 320 respectively). As shown, the darts are as follows: layer 280: single French darts 285, layer 290: a front waist dart 292 and armhole darts 294, layer 300: center front waistline darts 302, layer 310: flange darts 312, and layer 320: double French darts 322 for providing proper contour for the wearer. When pinched the tail fabric forms a 45° angle with the main surface of the protective material layer. This allows the dart tail to fall in a biased direction that allows the garment to smoothly shape to the contours of the woman's body. The various layers of the torso vest may be positioned such that when in an overlying relationship the excess fabric from the darts (dart tails) thickness is distributed throughout, keeping the assembled surfaces smooth. The dart tail edge seam, at the apex of the fold, may be reinforced with edge stitching to permit the dart tail to remain biased, i.e. permanently stay in one direction. The added substance of the dart may increase protection to the wearer at that portion of the garment.

Referring still to FIG. 12, with the alignment of the layers as depicted the layers of protective material provide enhanced protection against not only projectiles but also blunt trauma resulting therefrom, i.e. they reduce back face deformation caused by stopping projectiles. This design may be particularly effective against full metal jacketed rounds. Additional layers of protective materials may be added to provide additional levels of protection.

FIGS. 13-17 illustrate further use of darts within various layers of pliable protective insert 50.

FIG. 13 shows five bodice layers (outermost most to inner most: 350, 360, 370, 380, and 390 respectively) and darts as follows: layer 350: neckline darts 352 combined with single French darts 354; layer 360: center front waistline darts 362 combined with armhole darts 364; layer 370: front waist darts 372 combined with shoulder darts 374: layer 380: single French darts 382 combined with armhole darts 384, Layer 390: front waist darts 392 combined with below armhole darts 394.

Figure 14:
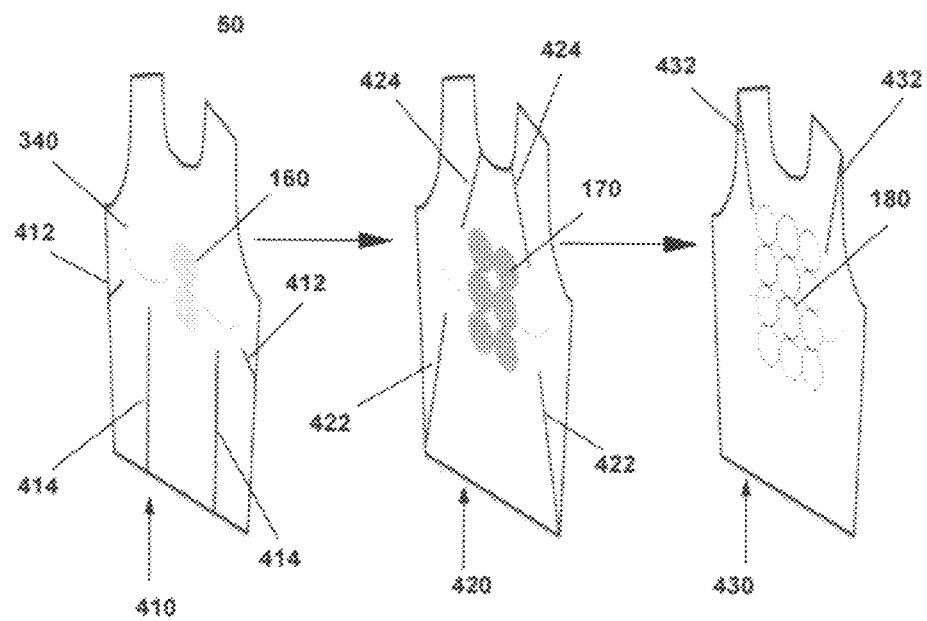
FIG. 14 is an exploded view of the assembly of the layers of ballistic disc protective material for a bodice.

FIG. 14 shows three bodice layers of protective material with overlaying ballistic discs attached in the fashion noted above (outer most to inner most: 410, 420, and 430 respectively) and darts as follows: layer 410: below armhole darts 412 and front waist darts 414; layer 420: French darts 422 and neck darts 424; and layer 430: shoulder plunge darts 432.

Figure 15:
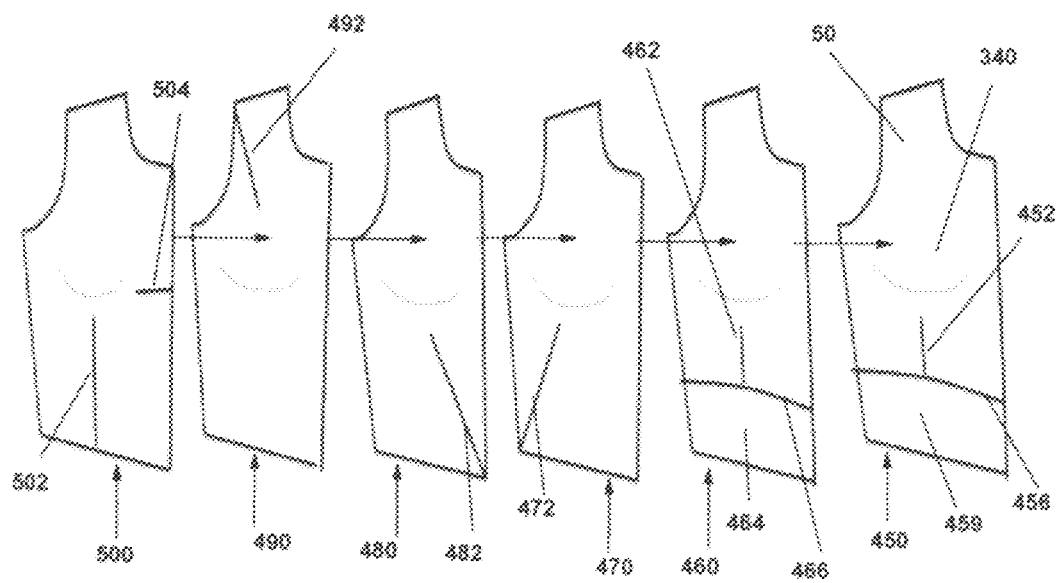
FIG. 15 is an exploded view of a series of contoured layers of pliable protective material for a front side panel.

FIG. 15 shows six front left vest section layers (outer most to inner most: 500, 490, 480, 470, 460, and 450 respectively) and darts and seams as follows: layer 500: front waist dart 502 and center bust dart 504; layer 490: shoulder plunge dart 492; layer 480: center front waist dart 482; layer 470: French dart 472; layer 460: empire waist dart 462, mid-rib yoke 464, and interconnecting seam 466; and layer 450: empire waist dart 452, mid-rib yoke 454, and interconnecting seam 456.

FIG. 16 shows six front left vest section layers (outer most to inner most: 530, 540, 550, 560, 570, and 580 respectively) and darts and seams as follows: layer 530: double French darts 532; layer 540: armhole dart 542; layer 550: front waist dart 552 and below armhole dart 554: layer 560: mid neck dart 562; layer 570: front waist dart 572 and armhole dart 574; and layer 580: mid shoulder dart 582 and center bust dart 584.

FIG. 17 shows three front left vest section layers of protective material with overlaying ballistic discs attached in the fashion noted above (outer most to inner most: 600, 610, and 620 respectively) and darts as follows: layer 600: front waist dart 602 and below armhole dart 604; layer 610: French dart 612 and neck dart 614; and layer 620: shoulder plunge dart 622.

In each of the above noted examples, the excess fabric of dart tails and seams is distributed throughout the layers of pliable protective insert 50 so as to provide added protection with less bulk and rigidity to the wearer. It will be appreciated that FIGS. 12 to 17 are exemplary and that the disclosed darts, seams and sequence may be manipulated as needed to achieve the desired balance between fit and protection. One or more of the above-shown darts and seams may be combined in numerous ways to achieve a desired contoured shape for the female form. The same method may be employed to contour pliable protective inserts for men (such as overweight men), and for other areas of the body (protective inserts for the posterior). In certain embodiments, the interconnecting seams will be placed in layers closer to the wearer's body. In each of the above examples, the darts and interconnecting seams are located at least about 1 to 3 inches from apex (tip of bust) as shown in FIGS. 12, 13, 14, 15, 16 and 17, where the apex is indicated at 340 on each drawing. This provides for a more accommodating fit and desirable look for the female wearer as the bust will not come to a point. Further, in certain embodiments more than one dart is used per layer of protective material within pliable protective insert 50 and preferably non-radial (from apex out) darts or seams are incorporated as well. See Location of bust fullness, pattern alteration (E-388, 05-06, Texas cooperative extension).

B. Carrier Shell

One of ordinary skill in the art will appreciate that a bullet resistant garment of the current invention may have any shape. A carrier shell based on a torso shape form/sloper is illustrated in the following embodiments, although as noted above slopers for other garments, such as pants, dresses, skirts, shorts, etc., may be contemplated as well. Carrier shells based on the torso sloper can be unobtrusive, provide concealable protection, and be integrated into other garments such as jackets, vests, suits, coats, shirts, hooded tops, etc. as part of an ensemble.

Figure 18:
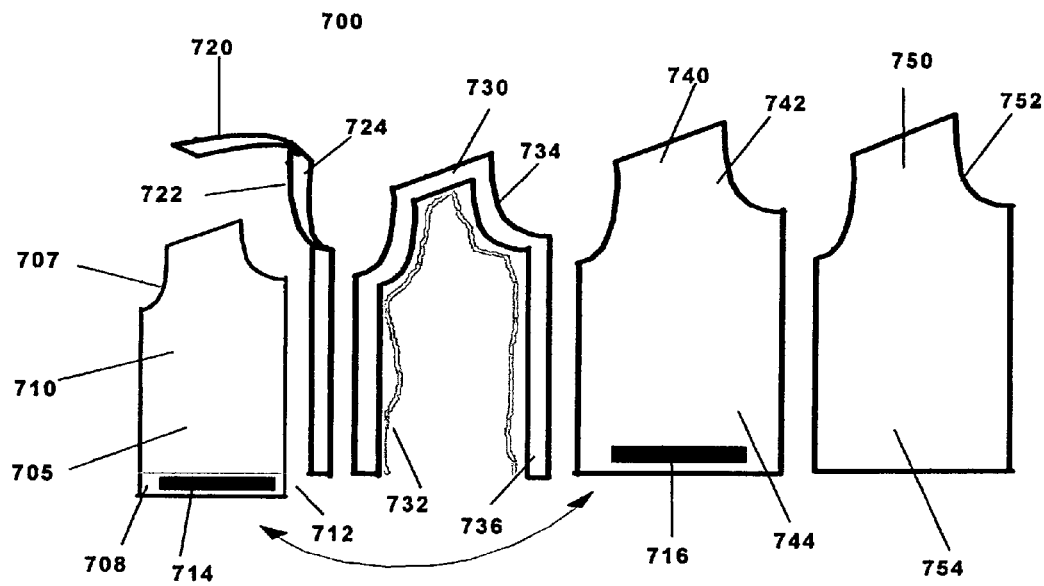
FIG. 18 is an exploded view of a support panel of a carrier shell.

FIG. 18 illustrates an exploded view of a front support panel 700 of carrier shell 20. Front support panel 700 may be assembled from at least four successive layers: an inner layer 710, a trim layer 720, a facing layer 730, and a backing layer 740 with an optional outer layer 750. Inner layer 710 has an inner face 705, an outer face 706, not shown, an exterior edge 707, and, in this particular embodiment, an extended portion 708. Trim layer 720 has an inner edge 722 and an outer edge 724. Trim layer 720 acts as a free spacer dimensioned appropriately for the thickness of pliable protective insert 50 so that the pliable protective insert may be easily inserted within the pocket/receptacle generated by the layered construction of support panel 700 and although held securely may move freely within the receptacle/pocket. The width of trim binding layer 720 should be sufficient to securely accommodate pliable protective insert 50, about the same width as thickness of pliable protective insert 50, and account for excess fabric needed for seams with inner layer 710 and facing layer 730. Further, trim binding layer in certain embodiments may be made of microfibers or grograin. Facing layer 730 has an interior edge 732, an exterior edge 734, an inner face 736, and an outer face 738, not shown in FIG. 18. Backing layer 740 has an exterior edge 742, an inner face 744, and an outer face 746, not shown in FIG. 18. Backing layer 740 acts as the main frame supporting each of the successive layers attached thereto: inner layer 710, trim binding layer 720, and facing layer 730. Optional outer layer 750 has an outer edge 752, an inner face 754 and an outer face 756, not shown in FIG. 18. The outer layer serves to provide the carrier shell with a clean finish, that is, a finished appearance without any rough edges and may provide the carrier shell with the appearance of a fashionable garment or outer-garment.

In this particular embodiment, inner layer 710, facing layer 730, and backing layer 740 are cut to the pattern of a front panel of a torso sloper. As is shown in FIG. 18, the exterior edge 707 of inner layer 710 may line up with interior edge 732 of facing layer 730 and similarly, exterior edge 734 of facing layer 730 and exterior edge 742 of backing layer 740 may line-up as well.

The assembly of front support panel 700 is illustrated as well. Trim binding layer 720, which may be continuous or semi-continuous, may have its inner edge 722 attached on a bias (at 45° angle) to exterior edge 707 of inner layer 710 so as to form an inner layer seam 726. Trim binding layer outer edge 724 may also be attached, on a bias, to interior edge 732 of facing layer 730 so as to form a facing layer seam 728, not pictured. By attaching trim bind layer on a bias the trim binding layer 720 may exhibit additional flexibility so as to provide some flexibility in using thicker or upgraded pliable protective inserts within support panel. Facing layer 730 is then attached to backing layer 740 such that the exterior edges of facing layer 730 and backing layer 740, 734 and 742 respectively, line-up.

The above-noted attachments may be reinforced through the use of additional seams and bonding. For example, an additional edge stitch, i.e., a topstitch, may be added all around external edge 704 of inner layer 710 and/or an additional edge stitch may be provided around inner edge 732 of facing layer 730. These additional stitches help secure adjoining seams, such as inner layer seam 726 and facing layer seam 728, thereby enhancing integrity of garment when subjected to impacts such as ballistic impacts. Without wishing to be bound to any particular theory, inventor believes this occurs by the force of the impact being transferred through the additional stitches as opposed to acting upon adjoining seams. This means of reinforcing support panel does not detract from the overall appearance of the carrier shell. Further, the facing layer 730 and backing layer 740 may reinforce their weave integrity, protecting against distortion or stretching of the layers, through the use of fusible interfacing on outer surface 738 of facing layer 730. An appropriate amount of steam, heat, and/or pressure on facing layer 730 allows good bonding of facing layer 730 to backing layer 740. Suitable fusible interfacing materials may include woven tricot 100% polyester or other polyester nylon blend fusible materials. It may be further realized above-noted seams and bonding may be applied to additional areas of pliable protective inserts, support panels, carrier shells, or outer-garments of the current bullet resistant garments to reinforce the garment against ballistic, projectile, penetrating, and or blunt force impacts. For example, the backing layer may be bound to the outer layer of support panel to reinforce the panel or fusible interfacing may be applied at the interface between carrier shell and outer garment to enhance the strength of the interface between the two garments. Similarly, adhesive may be used in conjunction with some of the attachment and securing members to reinforce their connection to the garments, i.e. zippers, hook and loop members, etc. It will also be appreciated that topstitching and edge stitching may be used to reinforce various seams within support panel, carrier shell, and outer garment.

When assembled, a pocket and/or receptacle having the dimensions of width of inner layer 710 and depth of the width of trim binding layer 720 is generated for receiving pliable protective insert 50. In certain embodiments, opening for pocket/receptacle may be provided along any side of pocket/receptacle, i.e. through trim binding layer 720. FIG. 18 illustrates a bottom side opening 712 for the pocket is present along bottom of front support panel 700 where, in this embodiment, trim binder layer 720 and facing layer 730 are non-continuous. Extended portion 708 of inner layer 710 may be of sufficient length to provide a closure over opening 712, and may in certain embodiments extend about 2 to 2.5 inches beyond the end of the inner edge 732 of facing layer 730. Extended portion of inner layer 708 has a first mating portion of a detachable fastener 714 on its inner face 705 and backing layer 740 has a second mating portion of the detachable fastener 716 on its inner face 744. Extended portion 708 of inner layer 710 may be folded towards side opening 712 to permit first mating portion of detachable fastener 714 to be secured to second mating portion of detachable fastener 716 on backing layer 740 and thereby close side opening 712 of the pocket.

Figure 19:
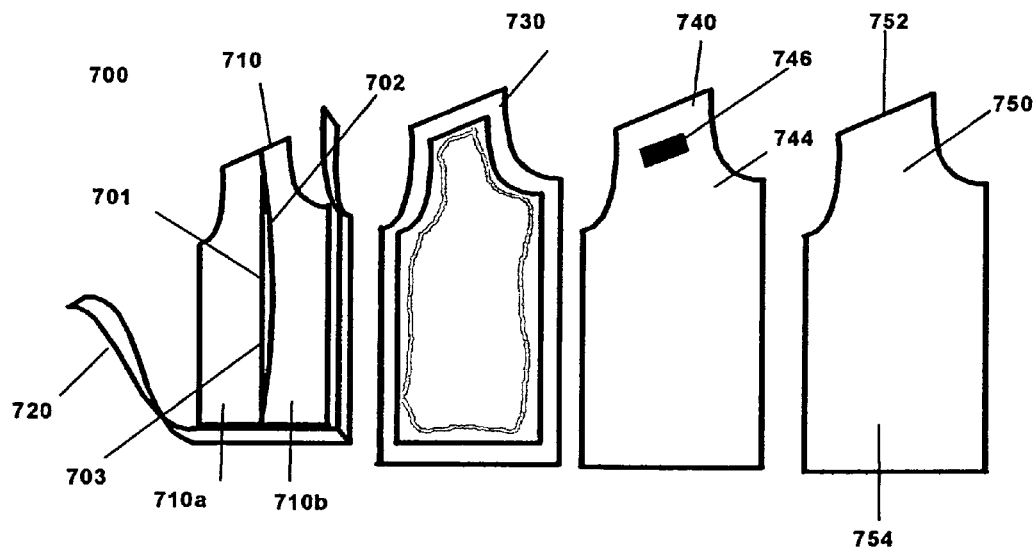
FIG. 19 is an exploded view of an alternative embodiment of a support panel of a carrier shell.

FIG. 19 illustrates an alternative embodiment of front support panel 700. Front support panel 700 may be comprised of the same four layers: inner layer 710; trim binding layer 720, facing layer 730, and backing layer 740, however, inner layer 710 is formed of two sub-sections: left 710a and right 710b. Also, trim layer 720 and facing layer 730 are continuous. Left sub-section 710a has an inner edge 701 and right sub-section 710b has an inner edge 702. Where left sub section 710a and right sub-section 710b of inner layer 710 meet along their interior edges, 701 and 702 respectively, an inner face opening 703 is formed, providing an opening through which pliable protective panel 50 may be inserted and/or removed. Inner face opening 703 can be present at various positions on the inner face 706 of inner layer 710 in various orientations including horizontal, diagonal, and/or vertical. Also, left sub-section inner edge 701 and right sub-section inner edge 702 may be present in a kissing and or overlapping relationship to one another at the position of inner face opening 703 and the inner edges, 701 and 702, may be attached along their upper or lower lengths to form seams. Although not illustrated within FIG. 19, a closure may be provided at inner face opening 703 such as a zipper closure or alternatively other types of opposed attachments such as pile like closures (VELCRO®), button closures, snap closures, buckle closures, hook and latch closures known to those skilled in the art, or any combinations thereof.

Additionally, FIG. 19 shows backing layer 740 with a first mating portion of an attachment 746 attached to inner face 744 of backing layer 740. When front support panel 700 is assembled first mating portion of attachment 746 is disposed within the pocket and serves as a means of securing pliable protective insert 50, having a second mating portion of attachment 110, to the support panel. Suitable mating attachments may include, but are not limited to, hook and loop fasteners (VELCRO®), zippers, buttons, magnets, snaps, and the like.

Further, in those embodiments where a contoured pliable protective insert may be used the various layers of front support panel 700: i.e. inner layer 710, facing layer 730, and backing layer 740 may incorporate darts and/or interconnecting seams to provide a three-dimensional or contoured shape to the support panel. Such embodiments are illustrated by FIGS. 20 and 21. FIG. 20 illustrates a left front support panel 760 that incorporates inner layer 710 having left sub-section 710a and right sub-section 710b with opening 703; trim binding layer 720, facing layer 730, backing layer 740, and outer layer 750. Facing layer 730 and backing layer 740 each incorporate a princess seam, 770 and 775 respectively, to provide a three dimensional or contoured shape to left front support panel 760. Further outer layer 750 incorporates a front waist dart 780 and an armhole dart 785 as well.

FIG. 21 illustrates a front bodice support panel 820 having inner layer 710 with left and right sub-sections, 710a and 710b respectively; trim binding layer 720, facing layer 730, backing layer 740 and outer layer 750. Left and right sub-sections of inner layer, 710a and 710b, facing layer 730, and outer layer 750 each incorporate princess seams, 790, 795, 800 and 805, 810 and 815 respectively. Backing layer 750 incorporates shoulder darts 820 and front waist darts 825 to contour front bodice support panel 820.

FIGS. 22A and 22B illustrate the exterior and interior face of an assembled support panel 827, respectively, patterned on the rear panel of a torso sloper similar in structure to the support panel of FIG. 19. Inner layer 710 has two sub-sections: left 710a and right 710b which form opening 703 to a pocket 830. Trim binding 720 joins inner layer 710 to facing layer 730 and defines depth of pocket 830. FIGS. 22A and 22B show an unfinished exterior edge 752 (rough with exposed threads) of backing layer 750.

FIG. 23 is a view of a partially assembled carrier shell based on a torso sloper pattern. Partially assembled carrier 835 may be assembled from a left front support panel 840, a rear support panel 845, and a right front support panel 850. A left seam 855 is formed from the attachment of a right side edge 841 of left front support panel 840 and a left side edge 846 of rear support panel 845 thereby connecting the panels. A right seam 860 is formed from the attachment of a right side edge 847 of rear support panel 845 with a left side edge 851 of right front support panel 850 thereby connecting the two panels. Top edge 842 of left front panel 840 will be attached to a left top edge 848 of rear support panel 845 to form a left shoulder seam 865, not shown in FIG. 23, and a top edge of right front panel 852 will be attached to a right top edge 849 of rear support panel 845 to form a right shoulder seam 870, not shown in FIG. 23. Upon attachment of left side seam 855, right side seam 860, left shoulder seam 865, and right shoulder seam 870 a head/neck opening and armhole openings are defined. As shown in FIG. 23 and FIG. 28 below seams may integrate reversible closures such as zippers, for example zippers (875) and (880) in left side seam 855 and right side seam 860, respectively. In FIG. 23, zippers 875 and 880 permit the carrier shell armholes to be widened for donning the garment and subsequently tightened to assure maximum protection by the ballistic panels within the carrier shell. Other suitable reversible closures known to those skilled in the art such as snaps, buckles, VELCRO®, and hook and latch closures may also be incorporated into seams.

Figure 24:
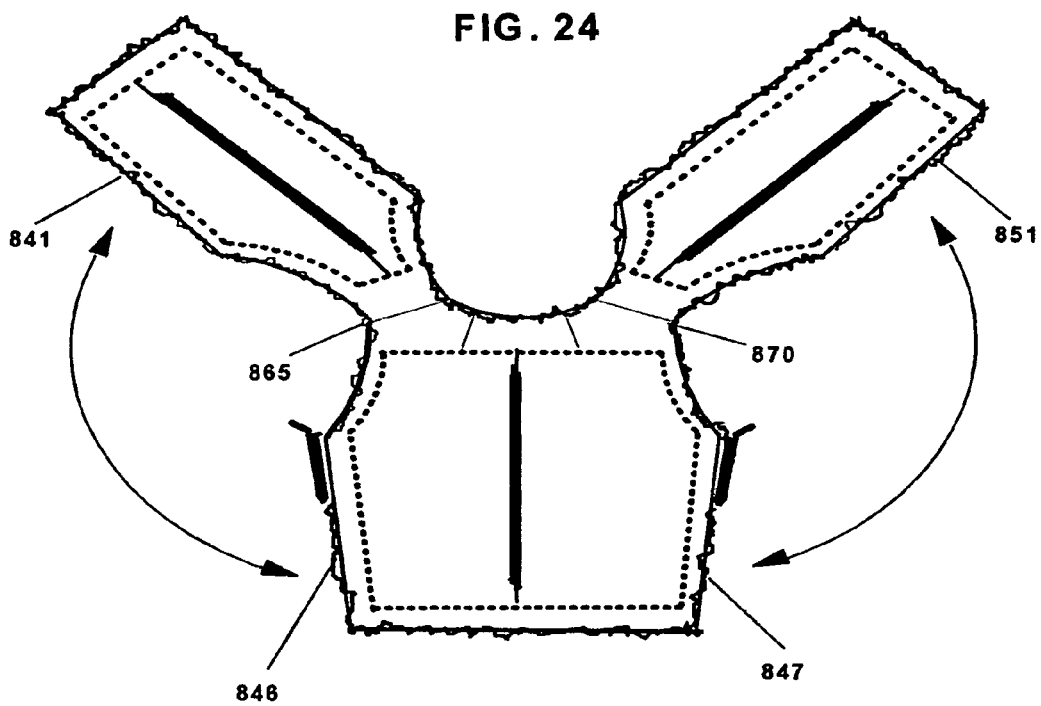
FIG. 24 is an interior view of a partially assembled carrier shell illustrating an alternative embodiment for assembling the carrier shell.
Figure 25:
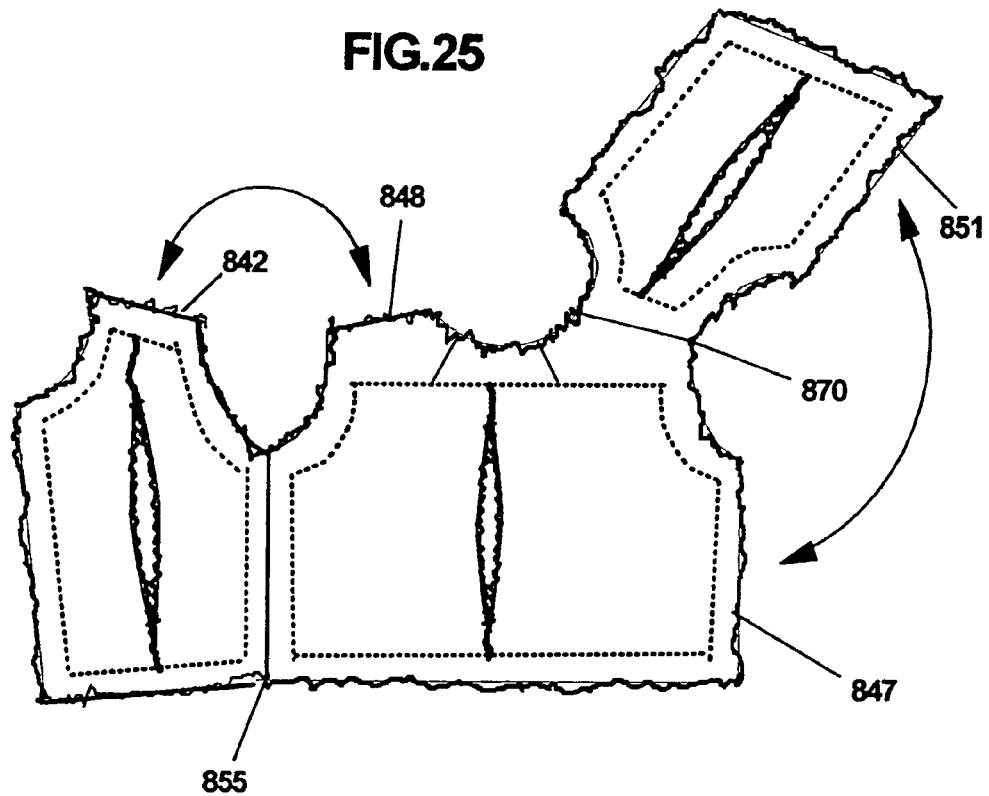
FIG. 25 is an interior view illustrating a further option for assembling carrier shell.

FIGS. 24 and 25 illustrate, from the view of the interior face, alternative means of attaching the panels to arrive at a carrier shell of the current invention. FIG. 24 shows left shoulder seam 865 and right shoulder seam 870 may be attached first and then left seam 855 and right seam 860 may be generated to complete the carrier shell. FIG. 25 shows a method of assembling the panels into the carrier shell in which left side seam 855 and right shoulder seam 870 are generated and then left shoulder seam 865 and right side seam 860 are generated to complete carrier shell.

FIG. 26 illustrates the intermediate construction step of a carrier shell comprised of support panels of the embodiment shown within FIG. 18 disclosed above. It will be appreciated that the support panels may be assembled in a similar fashion as illustrated in FIGS. 23-25.

FIG. 27 illustrates an assembled unfinished carrier shell 890 of the current invention. As shown in FIG. 27, left front support panel 840 and right front support panel 850 are attached to rear support panel 845 through left seam 855, right seam 860, left shoulder seam 865, and right shoulder seam 870. These attachments define armholes 876 and 877 as well as a head/neck opening 878. Unfinished carrier shell 950 has armhole edges 881 and 882, bottom edge 883, neck edges (rear 884, left side 885, and right side 886), and front opening edges (left 887 and right 888). In an alternative embodiment of the carrier shell, support panels may be comprised of four layers (inner layer, trim binder layer, facing layer, and backing layer) and assembled into an unfinished carrier shell. Separately an outer layer may be constructed similar in outline to that of FIGS. 23-26 and FIG. 28 either of a single material or of individual outer layers appropriate to each support panel joined together. The outer layer may then be assembled as discussed above to form an outer shell/façade for the unfinished carrier shell. The outer shell is then attached to unfinished carrier shell at one or more of the armhole edges 881 or 882, bottom edge 883, neck edges 884, 885, or 886, or front opening edges 887 or 888 to provide a clean finish to the carrier shell and/or the appearance of an actual garment as shown in FIGS. 28 and 29 below. In certain embodiments, outer shell may be attached at all edges except rear neck edge 884. In certain, embodiments, the outer shell/façade may conceal seams (355, 360, 365, and/or 370) of unfinished carrier shell 890.

FIG. 28 illustrates an alternative assembly of a carrier shell. A carrier shell 895 is shown with a front support panel 900 and a rear support panel 905. In this particular example, front and back support panels, 900 and 905, are contoured to fit the natural shape of the wearer's body through the use of seams and/or darts, 906 and 907. Front and back support panels, 900 and 905, may be connected at shoulder seams 901 and 902 which may incorporate closures 903 and 904, depicted as zippers within FIG. 28. Closures 903 and 904 allow wearer's head to easily slip into neck opening 878 and then closures may be fully or partially closed to provide a secure and comfortable fit at the neck opening. Other suitable closures known to those skilled in the art such as snaps, buckles, VELCRO®, and hook and latch closures may also be incorporated into shoulder seams 903 and 904.

FIGS. 27 and 28 illustrate the use of alternative openings, a single front opening or two side openings, to assist wearer in donning the carrier shell of the current invention. It will be appreciated that other configurations varying in number, configuration, and orientation may be contemplated as well. Further openings, contemplated may include, but not limited to, a single side opening, a single side and a single shoulder opening, a non-centered front opening, diagonal openings, a single back opening, etc.

Further, FIG. 28 illustrates that sides, 910 and 915, may be closed once carrier shell has been slipped over wearer's head using side closing mechanisms, here depicted as zipper pairs 911 and 912 and 913 and 914, respectively. Side closing mechanisms may be snaps, buckles, VELCRO®, zippers, hook and latch as well as other devices known to those skilled in the art.

FIG. 29 is another illustration of a finished carrier shell 920. The carrier shell has right front panel 850 undone to illustrate the use of detachable carrier panels 925, 836, and 837 to cover seams and front opening of carrier shell 920, respectively.

FIGS. 30A and 30B provide a prospective and exploded view of the detachable carrier panels. As can be seen in FIG. 30A, detachable carrier panel 925, which is illustrative of the assembly of detachable carrier panels, consists of a receptacle 926 having a first half of a first separable attachment 927 and a first half of a second separable attachment 928. Detachable carrier panel 925 may be assembled in a fashion similar to those disclosed above for support panel 700. FIG. 30B illustrates one embodiment of assembling detachable carrier panel 925 of the current invention. Detachable carrier panel 925 incorporates three successive layers: an inner layer 930; a trim binding layer 935; and an outer layer 940. Inner layer 930 has an outer edge 931, an exterior face 932, and an interior face 934, not shown. Trim binding layer 935 has an inner edge 936 and an outer edge 937 and is semi-continuous. As with support panel 700, the trim binding layer acts as a free spacer defining the depth of the resulting receptacle 926 for receiving a pliable protective insert, such as 190. In certain embodiments, the width of trim binding layer 935 approximates the thickness of the pliable protective insert to be used within receptacle 926. Outer layer 940 has an outer edge 941, an exterior face 943, an interior face 944, not shown, and an extension portion 942.

When assembled inner layer outer edge 931 and outer layer outer edge 941 are attached trim binding layer 935 inner edge 936 and outer edge 937, respectively, to form a receptacle/pocket into which a pliable protective insert may be inserted. The attachments between trim binding layer 935 and inner layer 930 and outer layer 940 may be reinforced in a similar manner as discussed above for support panel. As shown in FIG. 30B trim binding layer may not extend around one side of both inner layer outer edge 931 and outer layer outer edge 941 so as to provide an opening through which pliable protective insert may be inserted into the receptacle/pocket. Extension 942 should extend beyond inner layer outer edge 931 a sufficient distance to act as a flap to close over the opening to the receptacle/pocket. Inner layer 930 has a first attachment member 945 and extension of outer layer 942 has a second attachment member 946 such that when extension 942 is folded in towards the opening the second attachment member 946 comes into contact with first attachment member 945 thereby securely closing the opening to the pocket/receptacle. Further, first half of a first separable attachment 927 may be attached to receptacle 926 and a first half of a second separable attachment may be attached to an edge of receptacle 926 opposite where first half of a first separable attachment 927 was attached.

As shown in FIG. 26, openings and seams of the carrier shell may be flanked by the mating halves of the separable attachments on detachable carrier panel 925. Thus, seams 855 and 860 are flanked by a second half of a first separable attachment (856 and 862, respectively) and a second half of a second separable attachment (857 and 861, respectively). Similarly, the front opening of the carrier shell may have a second half of a first separable attachment 858 on one side of the opening and a second half of a second separable attachment 863 on the other side of the opening.

As shown in FIG. 29, when detachable carrier panel 925 is attached to carrier shell by the mating of first half of a first separable attachment 927 with second half of a first separable attachment 862 and a first half of a second separable attachment 928 with second half of second separable attachment 861 it covers seam 860 and provides additional protection. Similarly, detachable carrier panel 837 provides protection over front opening. The mating portions of the separable attachments may be attached to appropriate faces of interior of carrier shell and in certain embodiments the mating portions may be on inner face of inner layer so as to provide an overlap between pliable protective insert 50 and protective insert 190. Thus, detachable carrier panels provide supplementary protection to the wearer and in particular may provide enhanced protection to vital areas such as the heart, lungs, kidneys, etc.

Separable attachments suitable for use with the detachable carrier panels of the current invention may include, but are not limited to, zippers, hook and loop fasteners (VELCRO®), buttons, snaps, and the like. In certain embodiments, zipper and hook and loop fasteners may be used. In further embodiments, the first and second separable fasteners used on detachable carrier panel are not the same. In yet another embodiment one separable fastener is a zipper and the other fastener is a hook and loop fastener. The dual attachment of the detachable carrier panel provides for several options for the wearer comfort and convenience. For example, when not threatened, the wearer may completely detach detachable carrier panel. Alternatively, wearer may undo one of the separable attachments and fold detachable carrier panel back away from opening or seam it was covering and tuck it into carrier shell. In this embodiment, the detachable carrier panel may be easily deployed again by merely folding the panel back over the opening or seam and reattaching the one separable attachment. This embodiment is particularly suitable for detachable carrier panel 827 which overlaps front opening of carrier vest. An additional mating member for separable attachment may be found within interior of carrier shell at a suitable location for securing loose end of detachable carrier panel when it is in a stored as opposed to a deployed configuration. Each separable fastener may be of sufficient length to allow adjustment of fit of detachable carrier panel for wearers comfort and optimal protection.

In certain embodiments of the current invention, the layers of carrier shell may incorporate micro fibers, synthetic fibers, and combinations which may be selected for particular attributes. In certain embodiments, layers closest to wearer, i.e. inner layer, trim binding layer, and facing layer may incorporate hydrophobic materials to assist in wicking moisture away from wearer and thereby enhance the wearers comfort.

Additionally, the multiple layers of overlapping fabrics incorporated into carrier shell of the current invention further assist in the ability of the garment to stop various threats, in certain embodiments projectiles, and in further embodiments ballistics. In certain embodiments, microfiber materials incorporated into the carrier shell have less than 1 denier filament. In embodiments meant to protect against ballistic threats, the layers of the carrier shell work in concert with the layers of protective material in pliable protective insert to slow and stop ballistics and to dissipate blunt force of the ballistic that may lead to non-penetrating injuries to internal organs and soft tissues.

Carrier shell of current invention is meant to be inconspicuous and provide the appearance of a normal garment and preferably a high-end fashionable garment and therefore it is also contemplate that materials used within the construction of such high-end garments including, but not limited to silks, cottons, synthetic fibers (nylon, polyesters, blends thereof, etc.), wool, or combinations thereof, are adaptable for use in the carrier shell of the current invention.

C. Assembled Bullet Resistant Garment

FIGS. 31-34 illustrate how the carrier vests of the current invention may be integrated, permanently and temporarily, into various outer-garments.

In general the outer-garments of the current bullet resistant garments are constructed and tailored to fit over the carrier shells of the current invention. In particular, the outer-garment may be semi-fitted, i.e. slightly larger in order to reduce the number of contact points between the carrier shell and outer-garment at various locations such as the waist, chest, armholes, shoulders and sides. In certain embodiments, the outer-garment and carrier shell may be approximately 1 to 2 inches away from each other at points away from where the garments are integrated. This spacing enhances ventilation, minimizes friction between the garments, reduces creasing and bulging of the garments, and enhances the wearer's freedom of movement. The carrier shell itself may be semi-fitted as well to accommodate the depth of pliable protective inserts thereby increasing the wearer's comfort when bending, turning, leaning and/or sitting and facilitating ventilation.

FIG. 31 provides one embodiment of a fully assembled bullet resistant garment 950 of the current invention. An outer-garment 952 is integrated with carrier shell 954 by attaching the two garments through the rear neck edge 884, down around front left neck edge 885 and right neck edge 886, and down left front edge 887 and right front edge 888. In this embodiment, the carrier shell 954 and outer-garment 952 share a front zipper opening 962. Notably, all edges of carrier shell 954 and outer-garment 952 are not connected and therefore the two garments can drape independently of one another and some freedom of movement is permitted relative to one another. As can be seen, the outer-garment 952 is semi-fitted permitting some space between outer face of carrier shell 954 and inner surface of outer-garment 952 through chest and waist areas of garment. Support panel 956, and detachable carrier panels 958, 960 and 970 are shown in phantom and indicate the enhanced degree of protection provided by the bullet resistant garments of the current invention.

FIG. 32 illustrates a further embodiment of a bullet resistant garment 970 of the current invention wherein the carrier shell 954 is permanently integrated into an article of ready to wear clothing 952. Carrier shell 954 and article of clothing 952 are integrated solely through a permanent attachment, such as by sewing, along rear neck edge 884. Respectively, the shoulder, armhole, side, waist, front neck, and center front areas are not integrated and remain loose. This allows both garments to move independently of one another avoiding friction that might inhibit body movement and concealing carrier shell 954.

A detachable closure mechanism 962 is attached at center front of carrier shell 954 allowing wearer to easily slip in and out of carrier shell. In certain embodiments, detachable closure mechanism may include, but are not limited to, a detachable zipper, VELCRO®, buttons, snaps, hook and loops system, buckles, straps as well as other devices known to those skilled in the art as equally well suited for securing the front opening together on carrier shell, outer-garments and/or ready to wear garments.

FIGS. 33A and 33B illustrate an embodiment in which carrier shell 954 and outer-garment 952 are integrated in a detachable fashion. As shown in FIG. 33A carrier shell 954 has a first member of a first detachable fastener 972 on the exterior (side furthest from wearer) of the rear neck edge is shown in phantom. Additionally, carrier shell has a first member of a second detachable fastener 976 and a first member of a third detachable fastener 980 along the left and right sides, respectively, of the front opening of carrier shell 954. As shown in FIG. 33B, outer-garment 952 has a second member of a first detachable fastener 974 along the rear neck edge of outer-garment 952, and a second member of a second detachable fastener 978 and a second member of a third detachable fastener 982, not shown. In this embodiment, carrier shell 954 and outer-garment 952 may be temporarily integrated by (1) joining first member of first detachable fastener 972 and second member of first detachable fastener 974 along the respective rear necklines of the two garments; (2) joining first member of second detachable fastener 976 with second member of second detachable fastener 978; and (3) joining first member of third detachable fastener 980 with second member of third detachable fastener 982. FIG. 1 illustrates the integration of carrier shell 954 of FIG. 30A and outer-garment 952 of FIG. 30B. Suitable detachable fasteners are known to those skilled in the art and may include, but are not limited to, zippers, VELCRO®, hook and loop fastener, adhesive fasteners, snaps, buttons, hooks, and the like. This embodiment provides benefits to the wearer in that the standard carrier shell 954 may be transferred from one outer-garment to another and further permits the wearer to have a greater wardrobe of bullet resistant garments as carrier shell 954 may be transferred to other outer-garments having suitable detachable fasteners. In yet a further embodiment, carrier shell may be provided with a sole attachment means at position 972, such as an adhesive, a hook pile, a clamp, and/or post and cap so that the carrier shell 954 may be incorporated into garments that do not possess mating members of detachable fasteners. Further, FIG. 33B indicates that outer garment possesses a front zipper closure 984 separate and apart from carrier shell 954.

Figure 34:
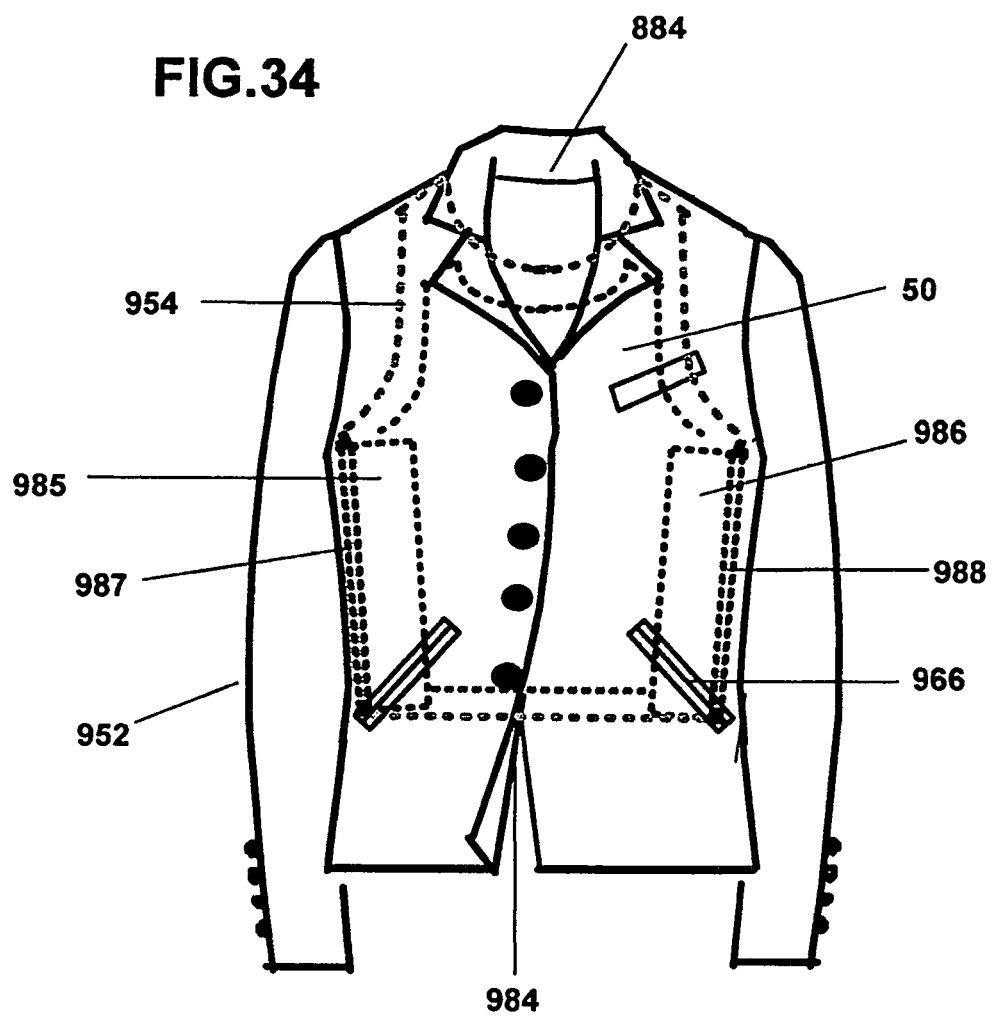
FIG. 34 shows an exterior view of a bullet resistant garment of the current invention with an alternative embodiment of carrier shell and pliable protective insert shown in phantom.

FIG. 34 illustrates a further embodiment of a bullet resistant garment of the current invention that integrates a carrier shell of an alternative embodiment. Carrier shell 954 of FIG. 34 is based on the side opening embodiment illustrated in FIG. 28 above. Carrier shell 954 may be integrated into outer-garment through the rear neck region 884. Further FIG. 34 depicts use of detachable carrier panels 985 and 986 to provide supplemental protection at side opening 987 and 988 respectively in a manner similar to that disclosed above.

It is noted that one benefit of the bullet resistant garments of the current invention is that the articles of clothing may include various design elements used in high fashion such as collars, pockets (966, FIGS. 32 & 34), buttons (964, FIG. 32), functional front openings (FIGS. 32-34) and other functional or non-functional trim applications. Further, the bullet resistant garments of the current invention may incorporate various fabrics and materials used within high-end fashion garments such as various biodegradable fabrics and high performance synthetic materials. Thus, the garments of the current invention provide a greater opportunity to match the individual user's sense of style and appear as high-end garments as opposed to bullet protective vests.

It will be appreciated that FIGS. 31 through 34 are merely illustrative and that those of ordinary skill in the art will recognize that the various attachments that integrate carrier shell with outer-garments may be positioned at various points along the garments and may use one or more types of attachments and/or combinations thereof provided they do not interfere with the independent draping and movement of the garments relative to one another.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

I hereby claim:

1. A three-dimensional protective insert comprised of:
(a) a plurality of layers of protective material having an exterior layer of protective material, an inner layer of protective material, and one or more layers of protective material between the exterior and interior layers of protective material;
(b) wherein each layer has an inner face and an exterior face and a shared edge;
(c) each layer has an edge, each edge has a finished edge, and each finished edge is capable of moving relative to the finished edges of adjoining layers;
(d) wherein an enhanced protective structure is provided comprised of a first layer of protective material with a first set of first ballistic discs each having an edge arranged on the face of the first layer of protective material in a first edge to edge arrangement; and a second layer of protective material, adjacent to the first layer of protective material, with a second set of second ballistic discs each having an edge arranged on the face of the second layer of protective material in a second edge to edge arrangement that is offset from the first edge to edge arrangement;
(e) and the enhanced protective structure includes at least one dart that provides a three dimensional structure to the protective insert; and
(f) wherein the plurality of layers of protective material and enhanced protection structure are bound at at least one point by a first attachment that prevents lateral movement of the plurality of layers relative to one another without impairing the movement of the finished edges of each layer relative to the adjacent layers; and
(g) wherein the pliable protective insert defeats at least a National Institute of Justice 0101.06 class IIIA threat.

* * * * *